United States Patent
Wu et al.

(10) Patent No.: US 11,362,090 B2
(45) Date of Patent: Jun. 14, 2022

(54) SEMICONDUCTOR DEVICE HAVING BURIED LOGIC CONDUCTOR TYPE OF COMPLEMENTARY FIELD EFFECT TRANSISTOR, METHOD OF GENERATING LAYOUT DIAGRAM AND SYSTEM FOR SAME

(71) Applicant: TAIWAN SEMICONDUCTOR MANUFACTURING CO., LTD., Hsinchu (TW)

(72) Inventors: Guo-Huei Wu, Hsinchu (TW); Pochun Wang, Hsinchu (TW); Chih-Liang Chen, Hsinchu (TW); Li-Chun Tien, Tainan (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/028,459

(22) Filed: Sep. 22, 2020

(65) Prior Publication Data
US 2021/0242205 A1    Aug. 5, 2021

Related U.S. Application Data

(60) Provisional application No. 62/968,527, filed on Jan. 31, 2020.

(51) Int. Cl.
*H01L 27/092* (2006.01)
*H01L 23/522* (2006.01)
(Continued)

(52) U.S. Cl.
CPC .......... *H01L 27/0922* (2013.01); *G06F 30/31* (2020.01); *G06F 30/392* (2020.01);
(Continued)

(58) Field of Classification Search
CPC ............ H01L 27/0922; H01L 23/5226; H01L 23/5286; H01L 21/823871; H01L 27/0688;
(Continued)

(56) References Cited

U.S. PATENT DOCUMENTS 4,971,009 A    11/1990   Washino et al.
7,260,442 B2   8/2007    Hwang et al.
(Continued)

FOREIGN PATENT DOCUMENTS

JP   2018190760    11/2018
KR   19900003029   3/1990
(Continued)

OTHER PUBLICATIONS

Office Action dated Nov. 30, 2021 for corresponding application No. KR 10-202020-0183582. English translation attached on p. 1. (pp. 1-6).
(Continued)

*Primary Examiner* — Karen Kusumakar
*Assistant Examiner* — Adam S Bowen
(74) *Attorney, Agent, or Firm* — Hauptman Ham, LLP

(57) ABSTRACT

A semiconductor device includes a buried logic conductor (BLC) CFET, the BLC CFET including: relative to a first direction, first and second active regions arranged in a stack according to CFET-type configuration; first and second contact structures correspondingly electrically coupled to the first active region; third and fourth contact structures correspondingly electrically coupled to the second active region; a first layer of metallization over the stack which includes alpha logic conductors configured for logic signals (alpha logic conductors), and power grid (PG) conductors, the alpha logic and PG conductors being non-overlapping of each other; and a layer of metallization below the stack
(Continued)

which includes beta logic conductors which are non-overlapping of each other; and wherein, relative to a second direction, each of the alpha logic, PG and beta logic conductors at least partially overlap one or more of the first, second, third and fourth contact structures.

20 Claims, 35 Drawing Sheets

(51) Int. Cl.
  *H01L 23/528* (2006.01)
  *G06F 30/392* (2020.01)
  *G06F 30/31* (2020.01)
  *H01L 21/8238* (2006.01)
  *G06F 111/02* (2020.01)

(52) U.S. Cl.
  CPC .. *H01L 21/823871* (2013.01); *H01L 23/5226* (2013.01); *H01L 23/5286* (2013.01); *G06F 2111/02* (2020.01)

(58) Field of Classification Search
  CPC ............... H01L 21/8221; H01L 27/092; H01L 27/0207; G06F 30/392; G06F 30/31; G06F 2111/02
  See application file for complete search history.

(56) References Cited

U.S. PATENT DOCUMENTS

| | | | |
|---|---|---|---|
| 9,256,709 | B2 | 2/2016 | Yu et al. |
| 2014/0040838 | A1 | 2/2014 | Liu et al. |
| 2015/0278429 | A1 | 10/2015 | Chang |
| 2018/0026042 | A1* | 1/2018 | Smith .................... H01L 27/11 257/390 |
| 2018/0374791 | A1* | 12/2018 | Smith ................... H01L 21/743 |
| 2019/0074296 | A1 | 3/2019 | Ryu et al. |
| 2019/0172828 | A1* | 6/2019 | Smith ................... H01L 27/124 |
| 2019/0288004 | A1* | 9/2019 | Smith ................... H01L 23/535 |
| 2019/0363167 | A1 | 11/2019 | Schultz |
| 2020/0075574 | A1* | 3/2020 | Smith ................ H01L 29/0692 |
| 2021/0118798 | A1* | 4/2021 | Liebmann ............ H01L 23/535 |

FOREIGN PATENT DOCUMENTS

| | | |
|---|---|---|
| KR | 20130065264 | 6/2013 |
| KR | 20200008529 | 1/2020 |
| KR | 20200011035 | 1/2020 |
| TW | 201727867 | 8/2017 |
| TW | 201937692 | 9/2019 |

OTHER PUBLICATIONS

Office Action dated Mar. 15, 2022 for corresponding case No. TW 11120257650. (pp. 1-4).

* cited by examiner

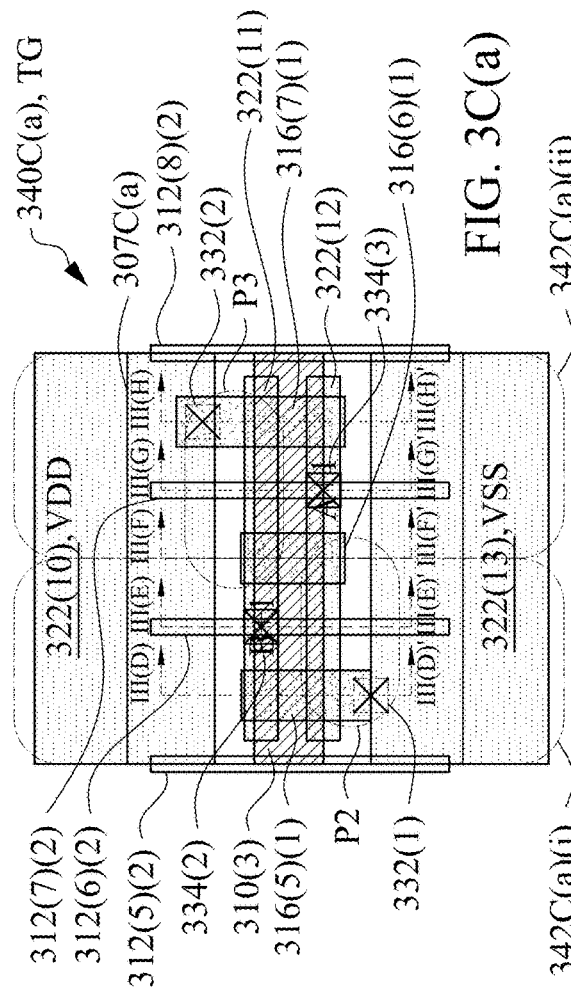
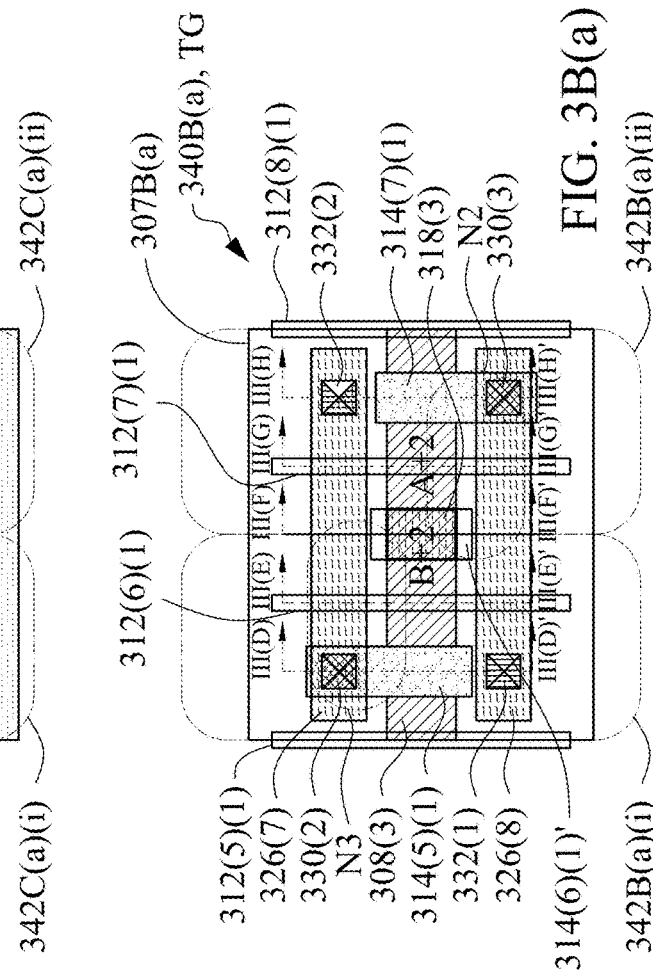
FIG. 3C(a)
FIG. 3B(a)
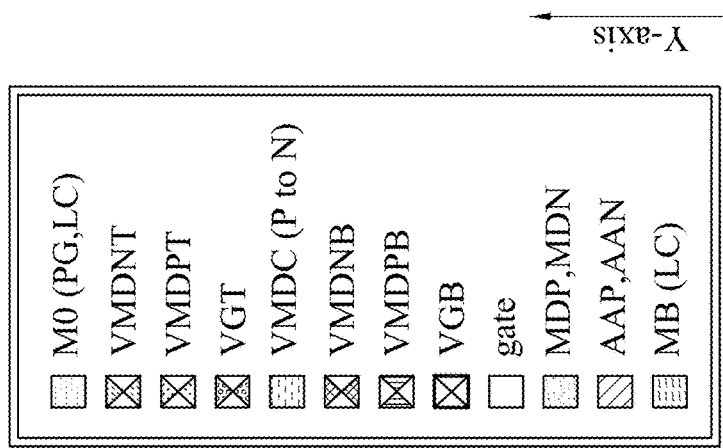

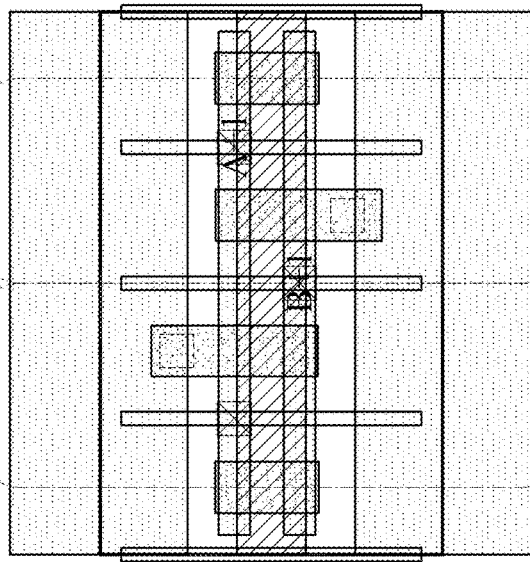
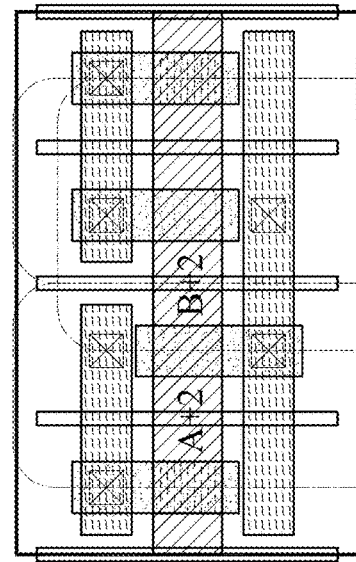
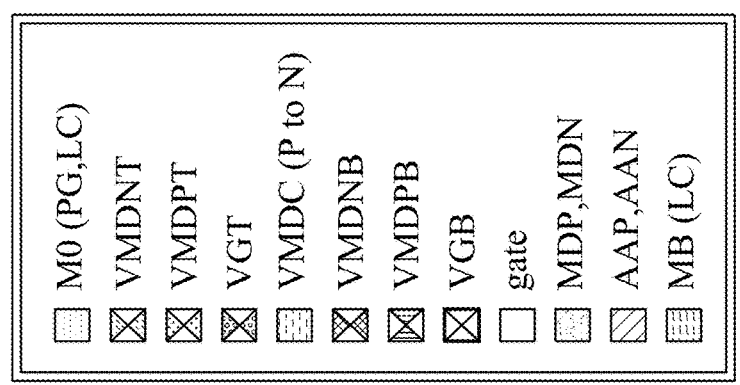
FIG. 3C(b)
FIG. 3B(b)

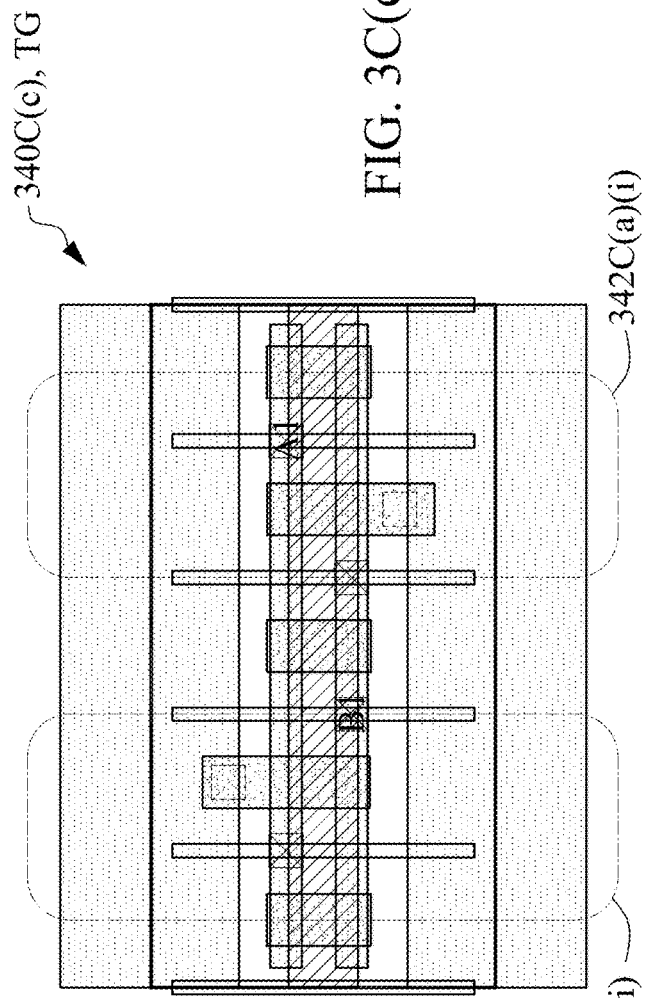
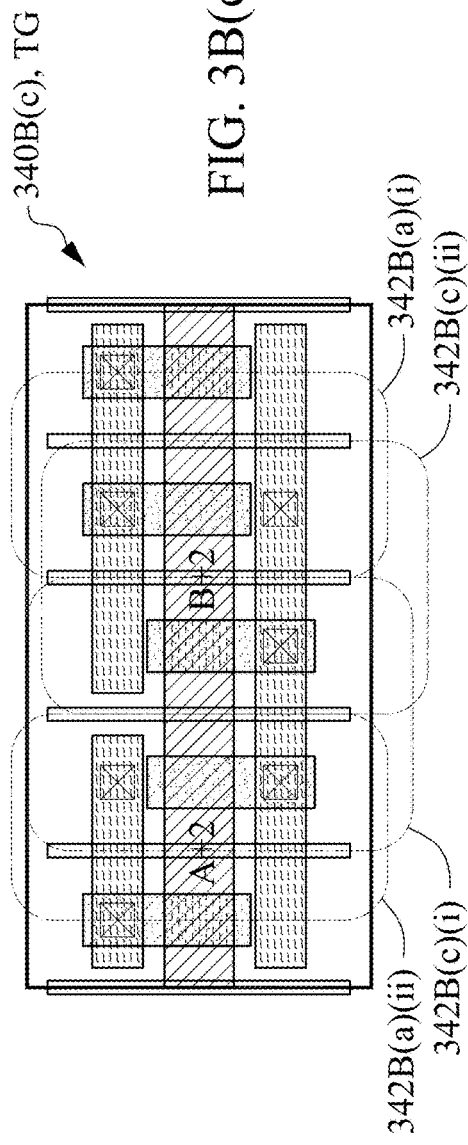
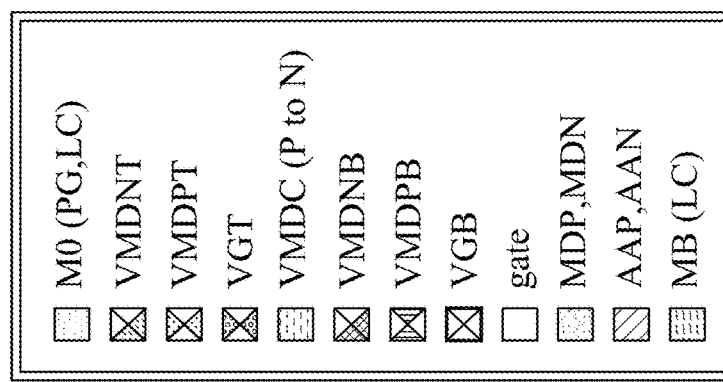
FIG. 3C(c)
FIG. 3B(c)

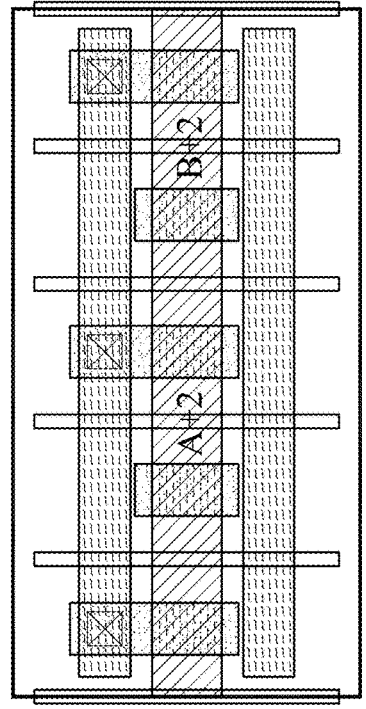
FIG. 3B(d)
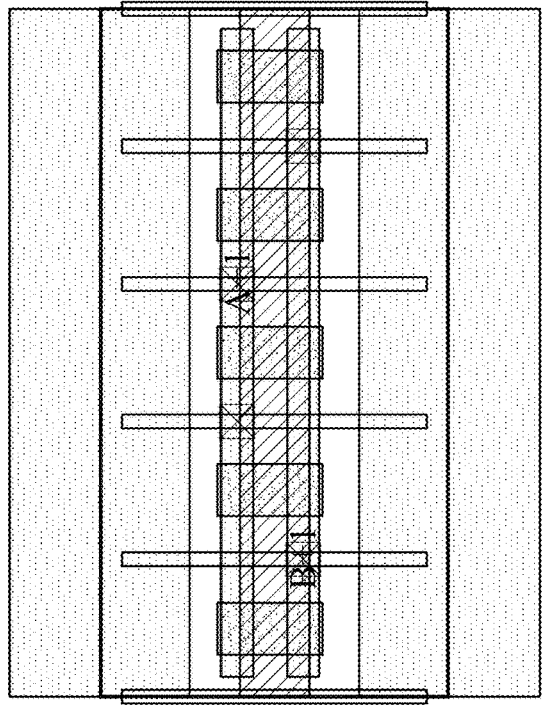
FIG. 3C(d)
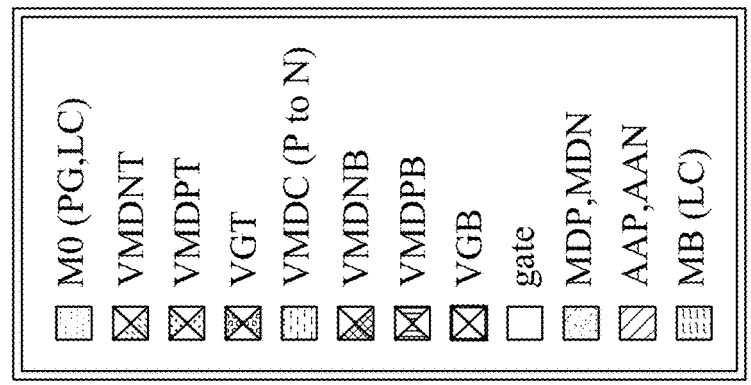

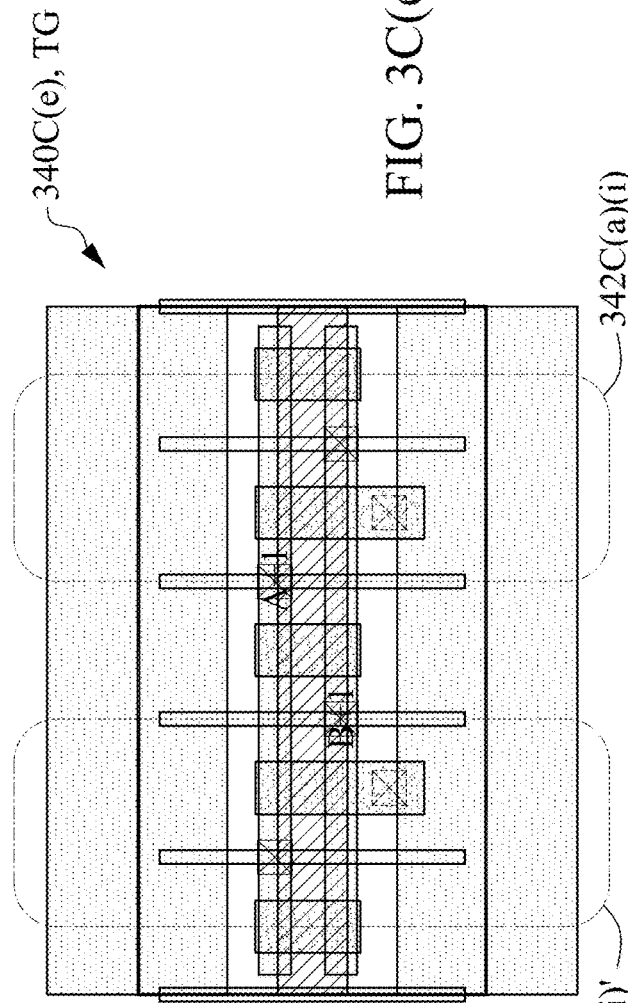
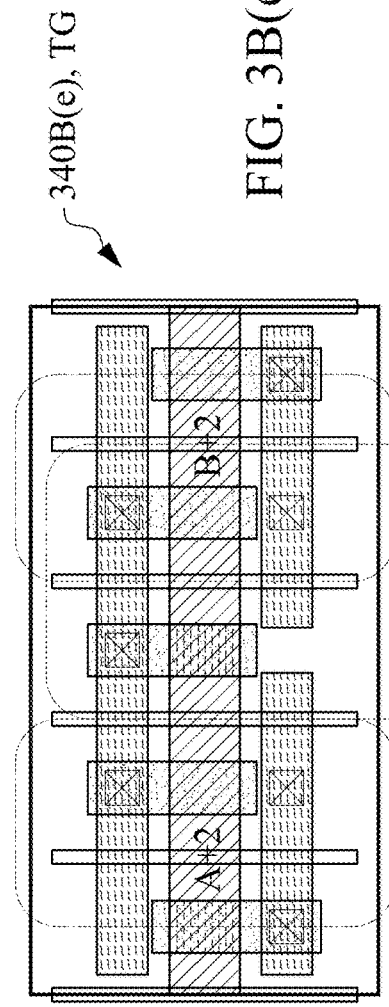
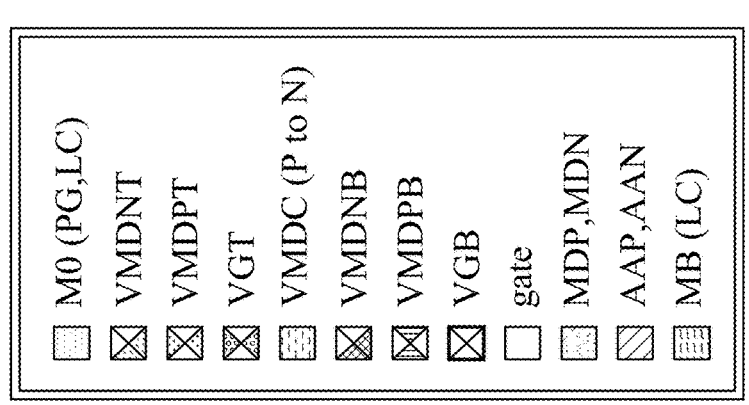

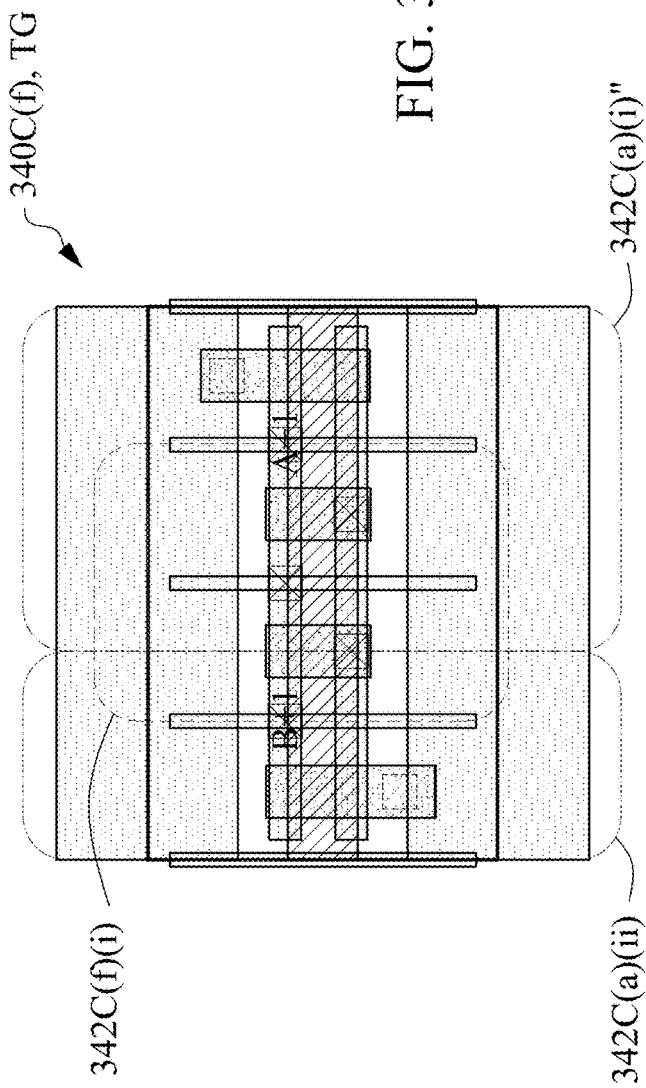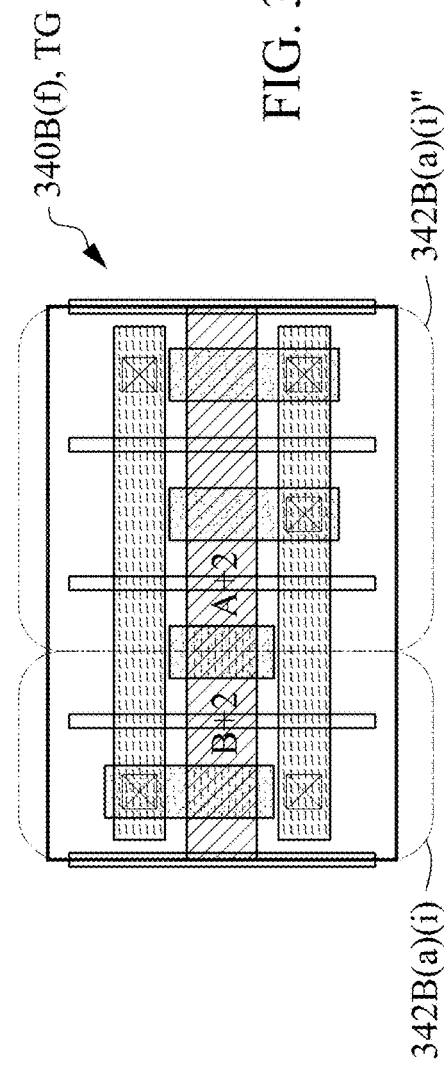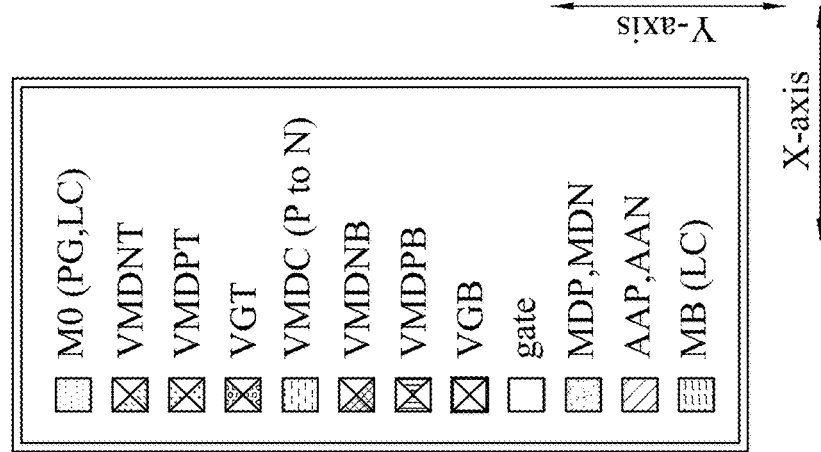

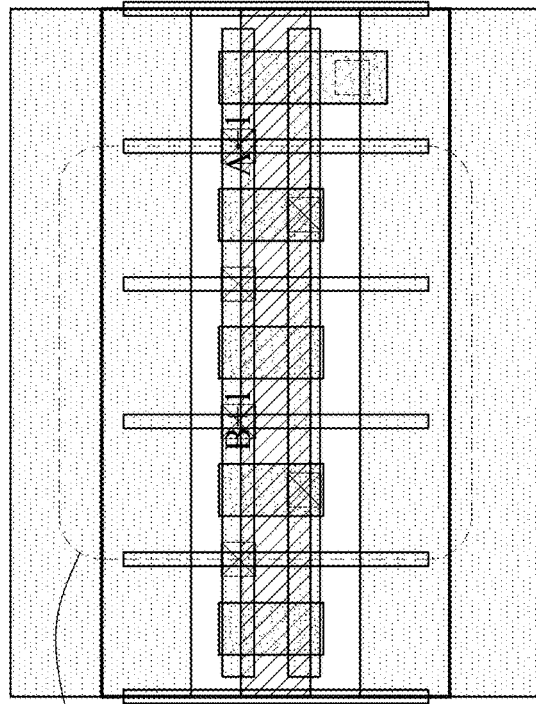
FIG. 3C(g)
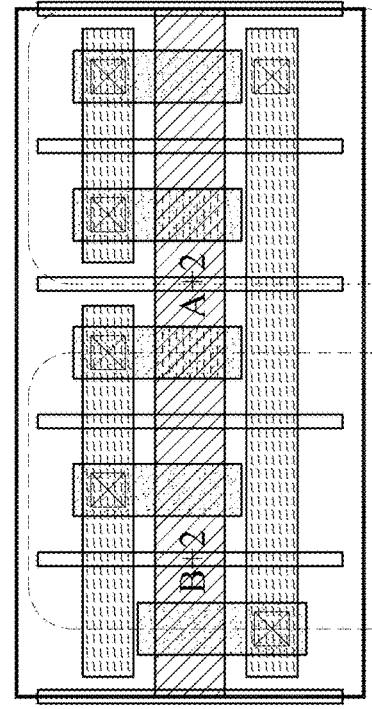
FIG. 3B(g)
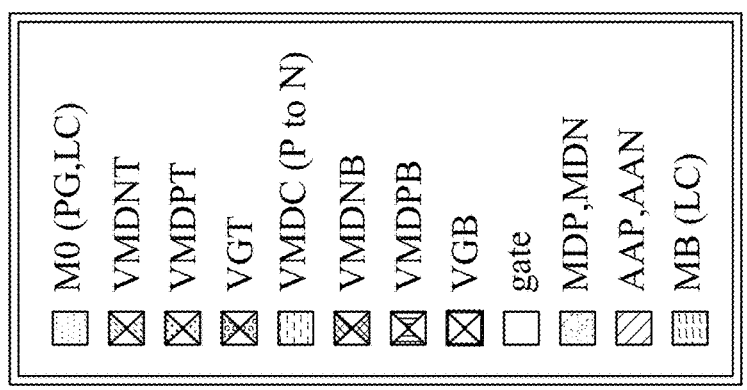

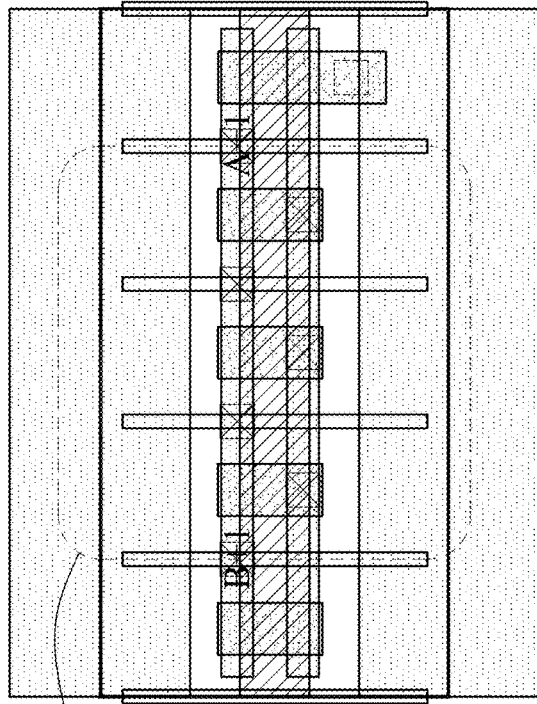
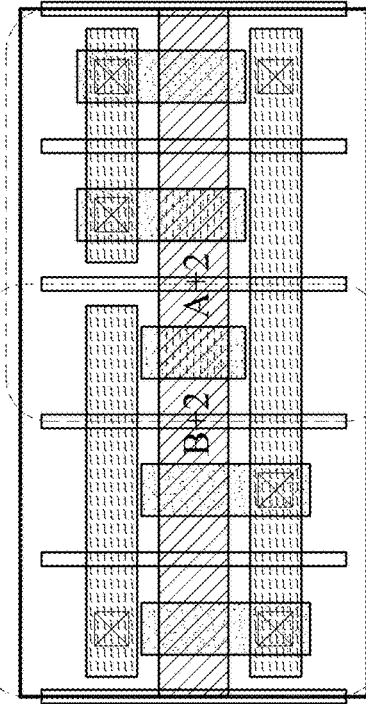
FIG. 3C(h)
FIG. 3B(h)

US 11,362,090 B2

SEMICONDUCTOR DEVICE HAVING BURIED LOGIC CONDUCTOR TYPE OF COMPLEMENTARY FIELD EFFECT TRANSISTOR, METHOD OF GENERATING LAYOUT DIAGRAM AND SYSTEM FOR SAME

PRIORITY CLAIM

The present application claims the priority of U.S. Provisional Application No. 62/968,527, filed Jan. 31, 2020, which is incorporated herein by reference in its entirety.

BACKGROUND

An integrated circuit ("IC") includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules for generating a layout diagram is specific to a process node by which will be fabricated a semiconductor device based on the layout diagram. The design rule set compensates for variability of the corresponding process node. Such compensation increases the likelihood that an actual semiconductor device resulting from a layout diagram will be an acceptable counterpart to the virtual device on which the layout diagram is based.

A basic complementary field effect transistor (CFET) includes a stack of first and second active regions in which the second active region is stacked over the first active region.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

The patent or application file contains drawings/photographs executed in color. Copies of this patent with color drawing(s)/photograph(s) will be provided by the Office upon request and payment of the necessary fee.

FIGS. 3B(a) and 3C(a) are corresponding layout diagrams representing a semiconductor device, in accordance with some embodiments.

FIGS. 3B(b) and 3C(b) are layout diagram variations of corresponding FIGS. 3B(b) and 3C(b), in accordance with some embodiments.

FIGS. 3B(c) and 3C(c) are layout diagram variations of corresponding FIGS. 3B(a) and 3C(b), in accordance with some embodiments.

FIGS. 3B(d) and 3C(d) are layout diagram variations of corresponding FIGS. 3B(c) and 3C(c), in accordance with some embodiments.

FIGS. 3B(e) and 3C(e) are layout diagram variations of corresponding FIGS. 3B(c) and 3C(c), in accordance with some embodiments.

FIGS. 3B(f) and 3C(f) are layout diagram variations of corresponding FIGS. 3B(c) and 3C(c), in accordance with some embodiments.

FIGS. 3B(g) and 3C(g) are layout diagram variations of corresponding FIGS. 3B(c) and 3C(f), in accordance with some embodiments.

FIGS. 3B(h) and 3C(h) are layout diagram variations of corresponding FIGS. 3B(b) and 3C(g), in accordance with some embodiments.

DETAILED DESCRIPTION

Figure 1:
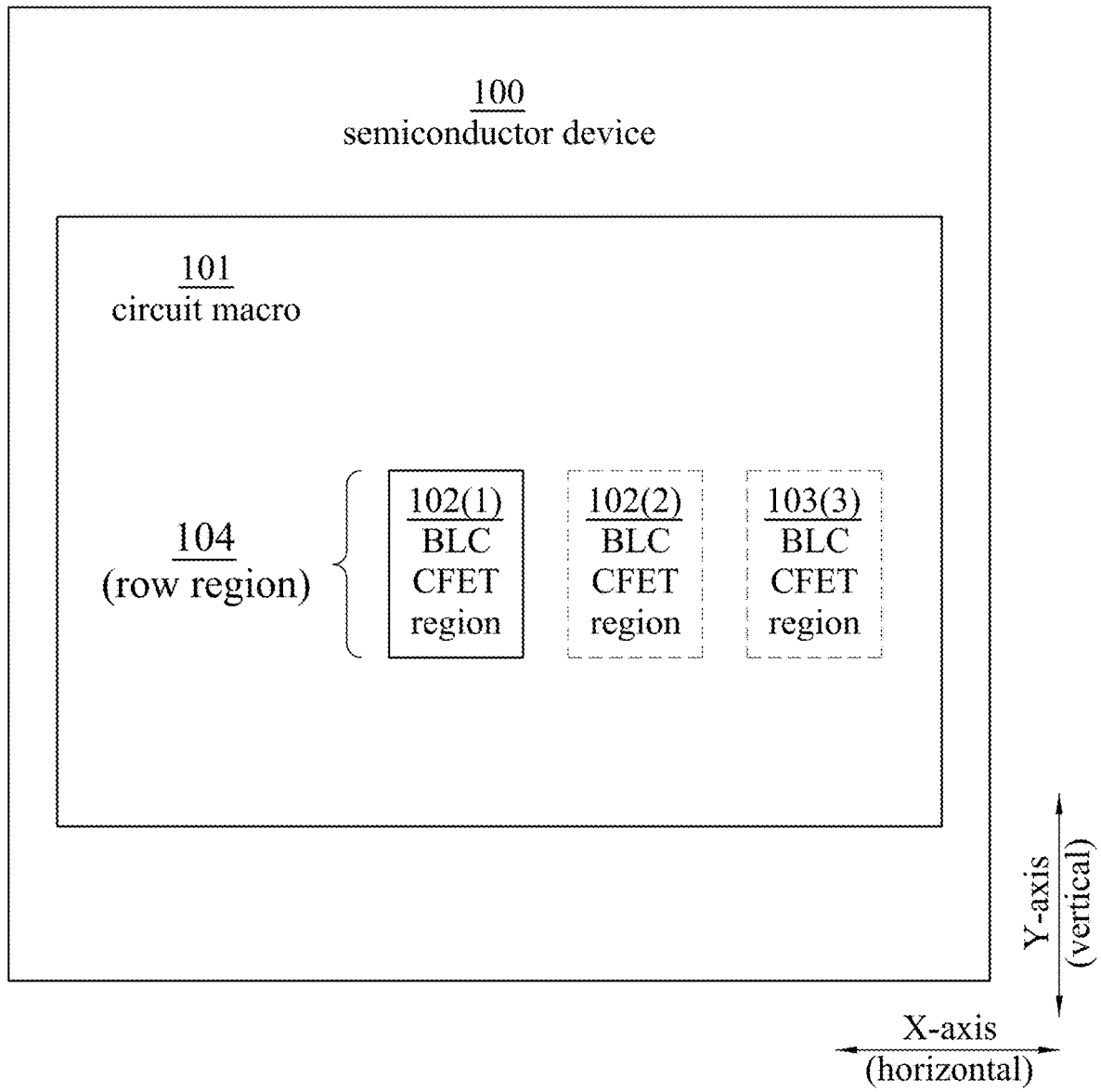
FIG. 1 is a block diagram of a semiconductor device, in accordance with at least one embodiment of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a CFET region has one or more logic conductors (e.g., for data signals or control signals) that are in a buried layer of metallization (MB layer) which is under active regions of the CFET region, and is referred to herein as a buried logic conductor (BLC) CFET region 102(1). Compared to another approach for a CFET which does not include a layer of metallization under the CFET's stack of active regions, and instead uses logic conductors in the M0 layer to conduct logic signals the CFET region of some embodiments has a benefit of providing an increased routing resource in M0 layer 220(2) (FIG. 2E). More particularly, the routing resource in the M0 layer which is consumed for conducting logic according to the other approach is available in the CFET regions of some embodiments because logic signals are conducted by corresponding logic conductors in the MB layer.

FIG. 1 is a block diagram of a semiconductor device 100 in accordance with at least one embodiment of the present disclosure.

In FIG. 1, semiconductor device 100 includes, among other things, a circuit macro (hereinafter, macro) 101. In some embodiments, macro 101 is an SRAM macro. In some embodiments, macro 101 is a macro other than an SRAM macro. Macro 101 includes, among other things, a row region 104 which extends in a first direction, e.g., substantially along the X-axis in FIG. 1, and which is sized to have a height (relative to a second direction substantially perpendicular to the first direction, e.g., substantially along the Y-axis in FIG. 1) which accommodates a CFET region 102(1) for which one or more logic conductors (e.g., for data signals or control signals) are buried under active regions of the CFET, which is referred to herein as a buried logic conductor (BLC) CFET region 102(1). Optionally, in some embodiments, row region 104 further includes BLC CFET region 102(2), with the optional aspect being shown by the use of a phantom (dashed) line. Optionally, in some embodiments, row region 104 further includes BLC CFET region 102(3). Optionally, in some embodiments, row region 104 further includes BLC CFET regions (not shown) in addition to BLC CFET regions 102(1), 102(2) and 102(3). Example layout diagrams resulting in row region 104 include the layout diagrams disclosed herein.

Figure 2A:
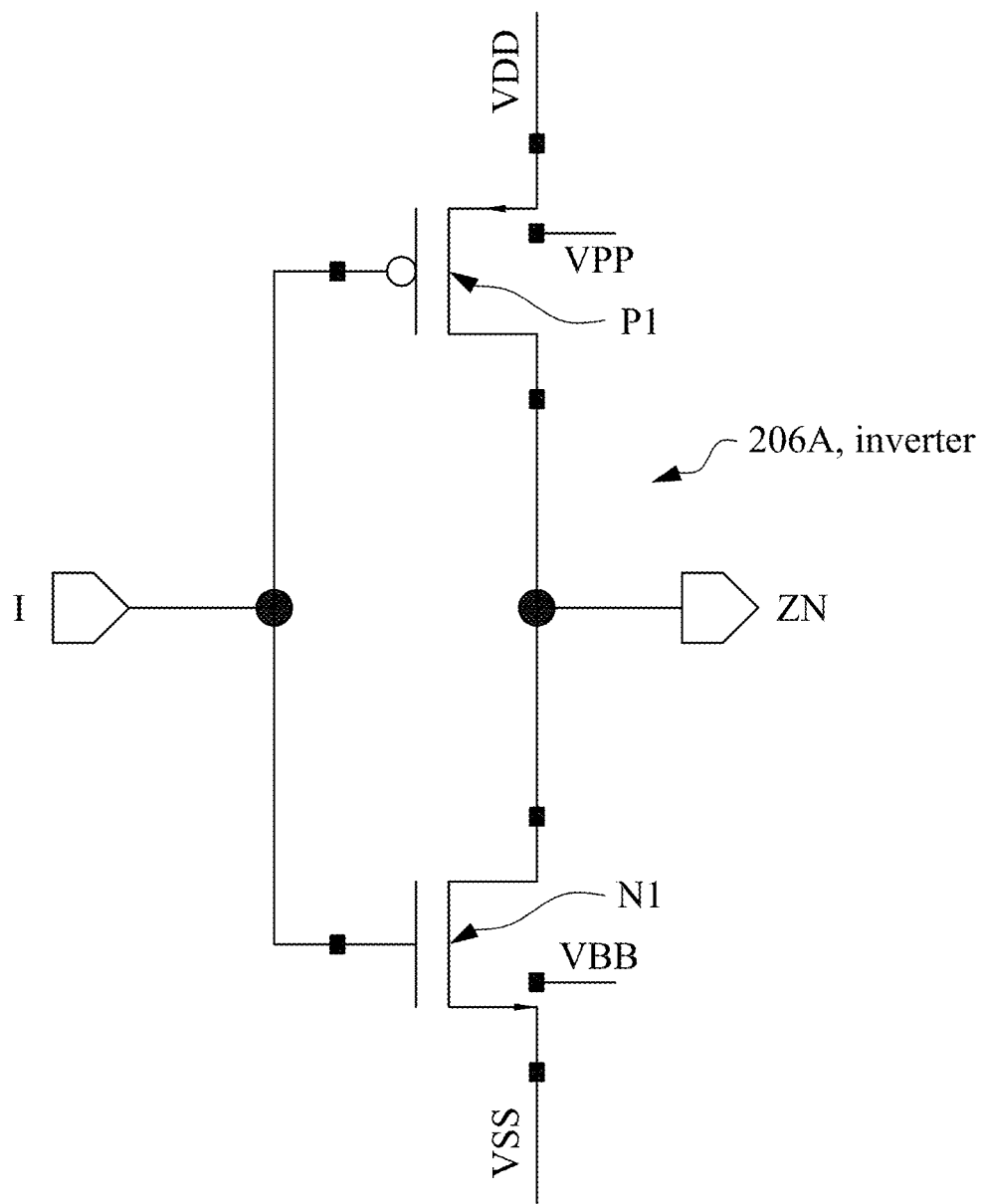
FIG. 2A is a circuit diagram, in accordance with some embodiments.

FIG. 2A is a circuit diagram of an inverter 206A, in accordance with some embodiments.

In FIG. 2A, inverter 206A includes PMOS transistor P1 and NMOS transistor N1, each of which is configured as a buried logic conductor (BLC) CFET. Inverter 206A has an input I and an output ZN.

Figure 2B:
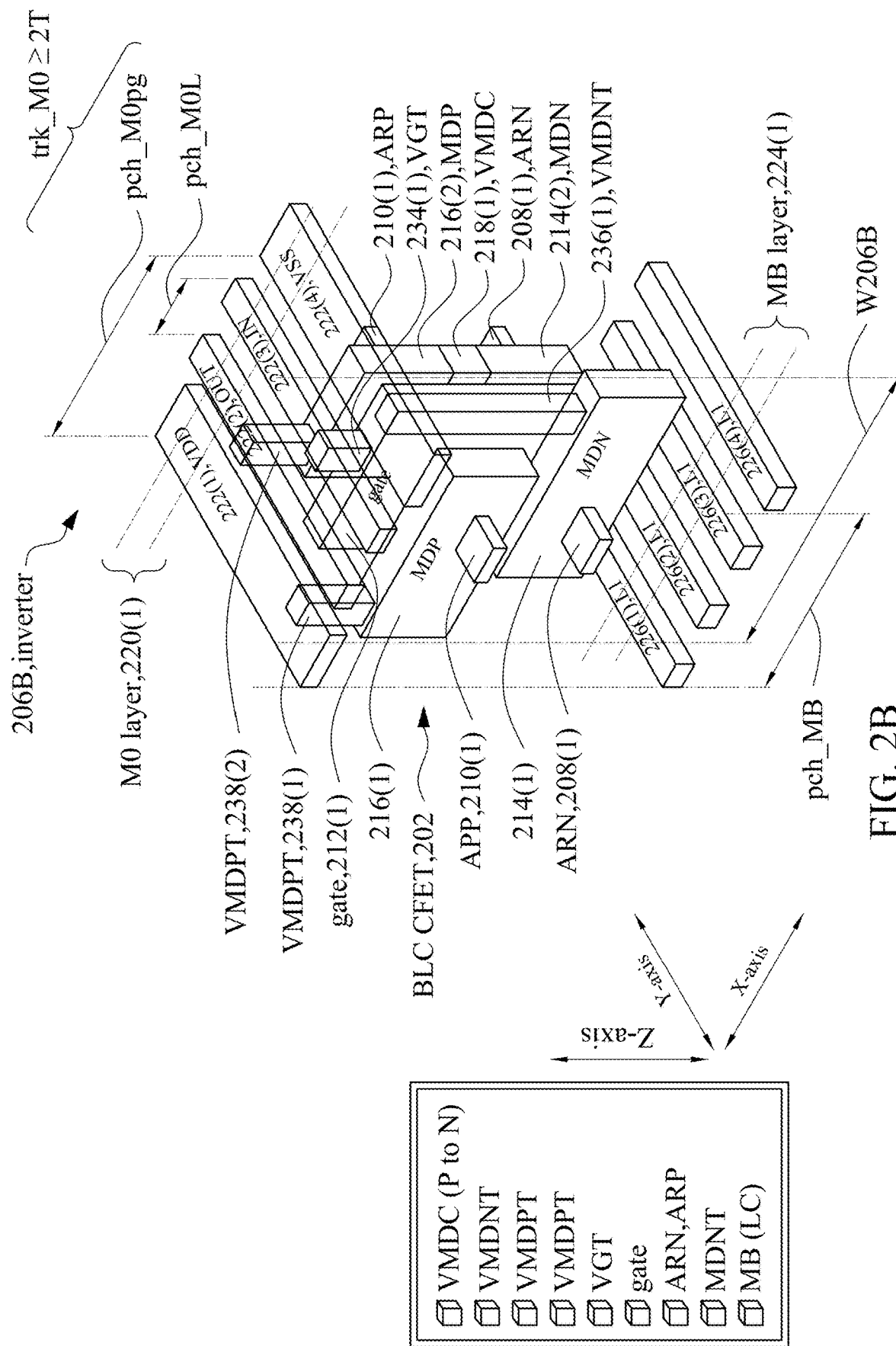
FIG. 2B is a three-dimensional view of a semiconductor device, in accordance with some embodiments.

FIG. 2B is a three-dimensional view of a semiconductor device 206B which includes BLC CFETs, in accordance with some embodiments.

In FIG. 2B, semiconductor device 206B is an inverter 206B corresponding to inverter 206A of FIG. 2A. Inverter 206B includes a buried layer (MB layer) 224(1) of metallization under a stack of a first active region 208(1) and a second active region 210(1), the stack being arranged according to a typical CFET-type configuration.

In FIG. 2B, first active region 208(1) is configured for NMOS transistor technology and second active region 210(1) is configured for PMOS transistor technology such that the stack of active regions 208(1) and 210(1) is configured for CMOS technology. In some embodiments, first active region 208(1) is configured for NMOS transistor technology and second active region 210(1) is configured for PMOS transistor technology such that the stack of active regions 208(1) and 210(1) is configured for CMOS technology. In some embodiments, the stack of active regions 208(1) and 210(1) is configured for technology other than CMOS technology. First active region (AR) 208(1) is referred to as ARN region 208(1) to indicate being configured for NMOS transistor technology and second active region (AR) 210(1) is referred to as ARP region 210(1) to indicate being configured for PMOS transistor technology.

In some embodiments, ARN region 208(1) and ARP region 210(1) are configured for nano wire transistor technology. In some embodiments, ARN region 208(1) and ARP region 210(1) are configured for nano sheet transistor technology. In some embodiments, ARN region 208(1) and ARP region 210(1) are configured for finFET transistor technology. In some embodiments, ARN region 208(1) and ARP region 210(1) are configured for planar transistor technology.

ARN region 208(1) and ARP region 210(1) extend in a first direction, which is substantially parallel to the X-axis in FIG. 2B. Relative to a second direction substantially perpendicular to the X-axis, the second direction being substantially parallel to the Z-axis in FIG. 2B, ARP region 210(2) is stacked over ARN region 208(1). Relative to a third direction substantially perpendicular to the X-axis and the Z-axis, the third direction being substantially parallel to the Y-axis in FIG. 2B, ARP region 210(1) is substantially aligned over ARN region 208(1), according to a typical CFET-type configuration. In some embodiments, the first, second and third directions are corresponding directions other than substantially parallel to the corresponding X-axis, Z-axis and Y-axis.

In FIG. 2B, inverter 206B further includes: a metal to NMOS source-drain (MDN) contact structure 214(1)) and an MDN contact structure 214(2) correspondingly electrically coupled to the ARN region 208(1), the latter being of NMOS configuration; a gate structure 212(1) electrically coupled to ARN region 208(1) and ARP region 210(1); a metal to PMOS source-drain (MDP) contact structure 216(1) and an MDP contact structure 216(2) correspondingly electrically coupled to ARP region 210(1), the latter being of PMOS configuration.

Inverter 206B further includes a first layer 220(1) of metallization (M_1st layer) over MDP contact structure 216(1), gate structure 221(1) and MDP contact structure 216(2). Here, it will be assumed that the numbering convention of the corresponding design rules of the corresponding semiconductor process technology node begins with a first metallization layer (M_1st layer) and an overlying first interconnection layer (VIA_1st) layer being referred to correspondingly as the M0 layer and the VIA0 layer. In some embodiments, the numbering convention begins with the M_1st layer and the V_1st layer being referred to correspondingly as the M1 layer and the VIA1 layer. M0 layer 220(1) includes logic conductors 222(2) and 222(3)) which are configured for logic signals, e.g., data signals and/or control signals; and power grid (PG) conductors 222(1) and 222(4).

In FIG. 2B, a width (along the X-axis) of the cell region represented inverter 206B, W206B, is sufficient to accommodate two logic conductors, namely logic conductors 226(2) and 226(3), and portions of two PG conductors, namely 226(1) and 226(4), in MB layer 224(1). In some embodiments, width W206B is W206B≈pch≈M0pg (see below). In some embodiments, a positive number of logic conductors other than two is provided in M0 layer 220(1) within the width of inverter 206B.

In M0 layer 220(1), power grid (PG) conductors 322(1) and 322(4) and logic conductors 322(2) and 322(3)) extend substantially parallel to the Y-axis and are non-overlapping of each other. In some embodiments, PG conductors 322(1) and 322(4) correspondingly provide voltages VDD and VSS. In some embodiments, PG conductors 322(1) and 322(4) correspondingly provide voltages other than voltages VDD and VSS. MB layer 224(1) includes logic conductors 226(1), 226(2), 226(3) and 226(4) which extend substantially parallel to the Y-axis and are non-overlapping of each other.

In FIG. 2B, the width (along the X-axis) of inverter 206B is sufficient to substantially accommodate four logic conductors, namely logic conductors 226(1), 226(2), 226(3) and 226(4) in MB layer 224(1). In some embodiments, a minimum number of two logic conductors, e.g., logic conductors 226(1) and 226(4) are provided in MB layer 224(1) substantially within the width of inverter 206B, which is indicated by logic conductors 226(2) and 226(3) having been drawn with phantom (dashed) lines. In some embodiments, a positive number of logic conductors other than two or four are provided in MB layer 224(1) within the width of inverter 206B.

Inverter 206B further includes: a via structure 218(1) which electrically couples MDN contact structure 214(2) and MDP contact structure 216(2), and is referred herein to as VMDC structure 218(1); a via structure 236(1) which electrically couples MDN contact structure 214(1) and PG conductor 322(4) in M0 layer 220(1), and is referred to herein as VMDNT structure 236(1); a via structure 234(1) which electrically couples gate structure 212(1) and logic conductor 322(3) in M0 layer 220(1), and is referred to herein as VGT structure 234(1); a via structure 238(1) which electrically couples MDP contact structure 216(1) and PG conductor 322(1) in M0 layer 220(1), and is referred to herein as VMDPT structure 238(1); and a VMDPT structure 238(2) which electrically couples MDP contact structure 216(2) and logic conductor 322(2) in M0 layer 220(1). Logic conductor 322(3) conducts the input signal, I, of inverter 206B. Logic conductor 322(2) conducts the output signal, ZN, of inverter 206B.

The M0 layer includes logic conductors for data or control signals and power grid (PG) conductors. The number of routing tracks, trk_M0, for logic conductors M0 layer 220(1) is a positive integer equal to or greater than two, 2≤trk_M0.

M0 layer 220(1) has multiple pitches (is multi-pitch) including: a pitch of PG conductors 221(1) and 222(4), referred to herein as pitch pch_M0pg; and a pitch of logic conductors 322(1) and 222(2), referred to herein as pitch pch_M0L. In some embodiments, for elements of the same type which have substantially parallel long axes of symmetry, e.g., PG conductors 221(1) and 222(4), or logic conductors 322(1) and 222(2), or the like, pitch represents a distance between the long axes of symmetry of immediately adjacent elements. In some embodiments, pch_M0L<pch_M0pg. MB layer 224(1) has single (sole) pitch, referred to herein as pitch pch_MB. In some embodiments, pch_MB≤pch_M0pg. In some embodiments, pch_M0L≤pch_MB.

Figure 2C:
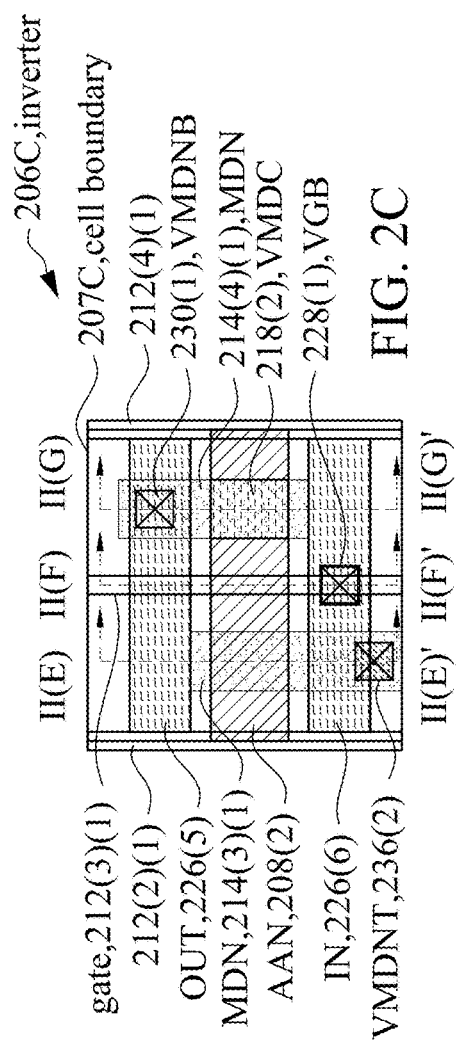
FIGS. 2C-2D are corresponding layout diagrams representing a semiconductor device, in accordance with some embodiments.
Figure 2D:
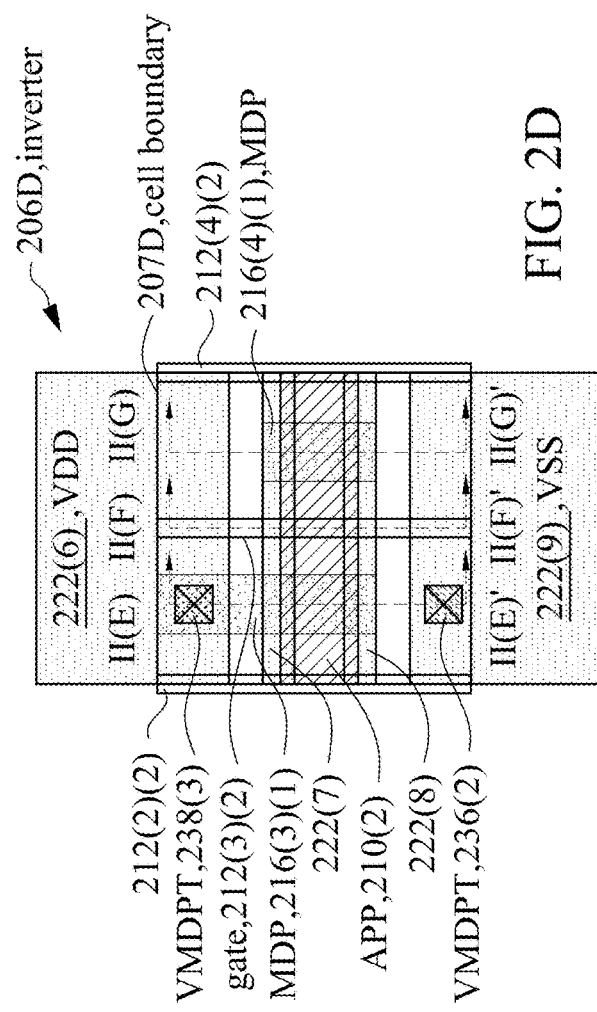
Figure 2E:
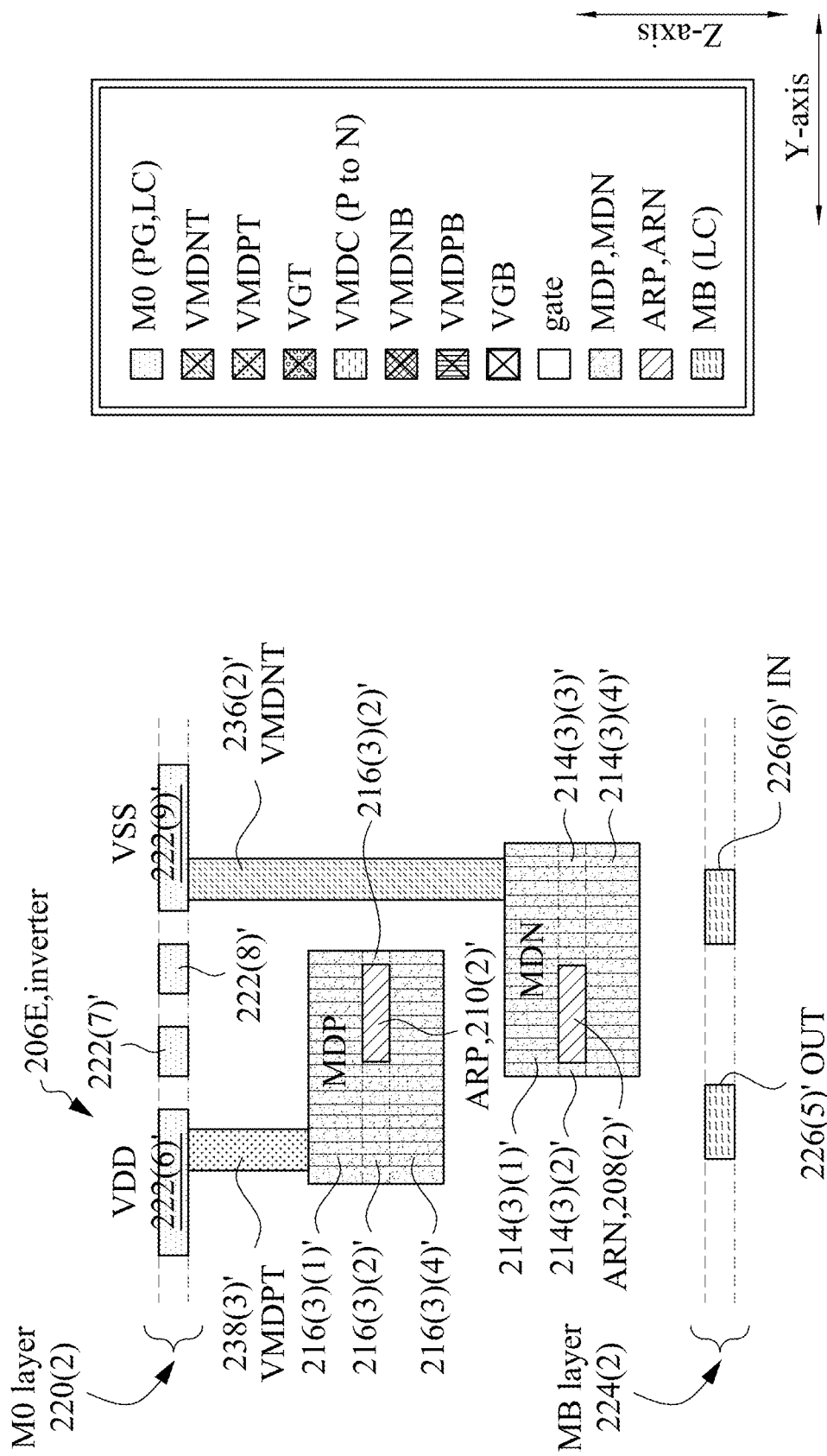
FIGS. 2E-2G are corresponding cross sections of a semiconductor device, in accordance with some embodiments.

FIGS. 2C and 2D are corresponding layout diagrams 206C and 206D representing a semiconductor device which includes BLC CFETs, in accordance with some embodiments.

Figure 2F:
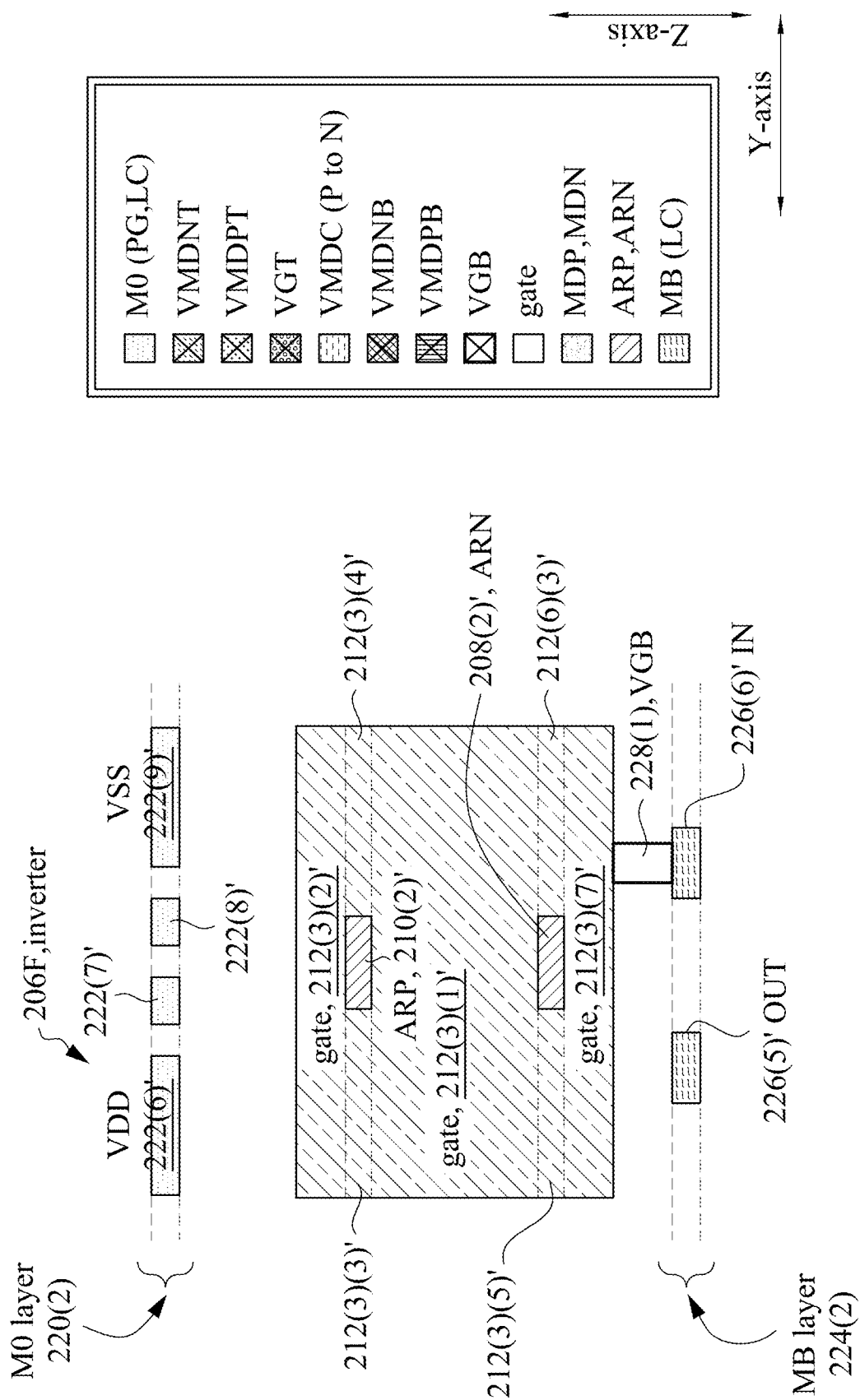
Figure 2G:
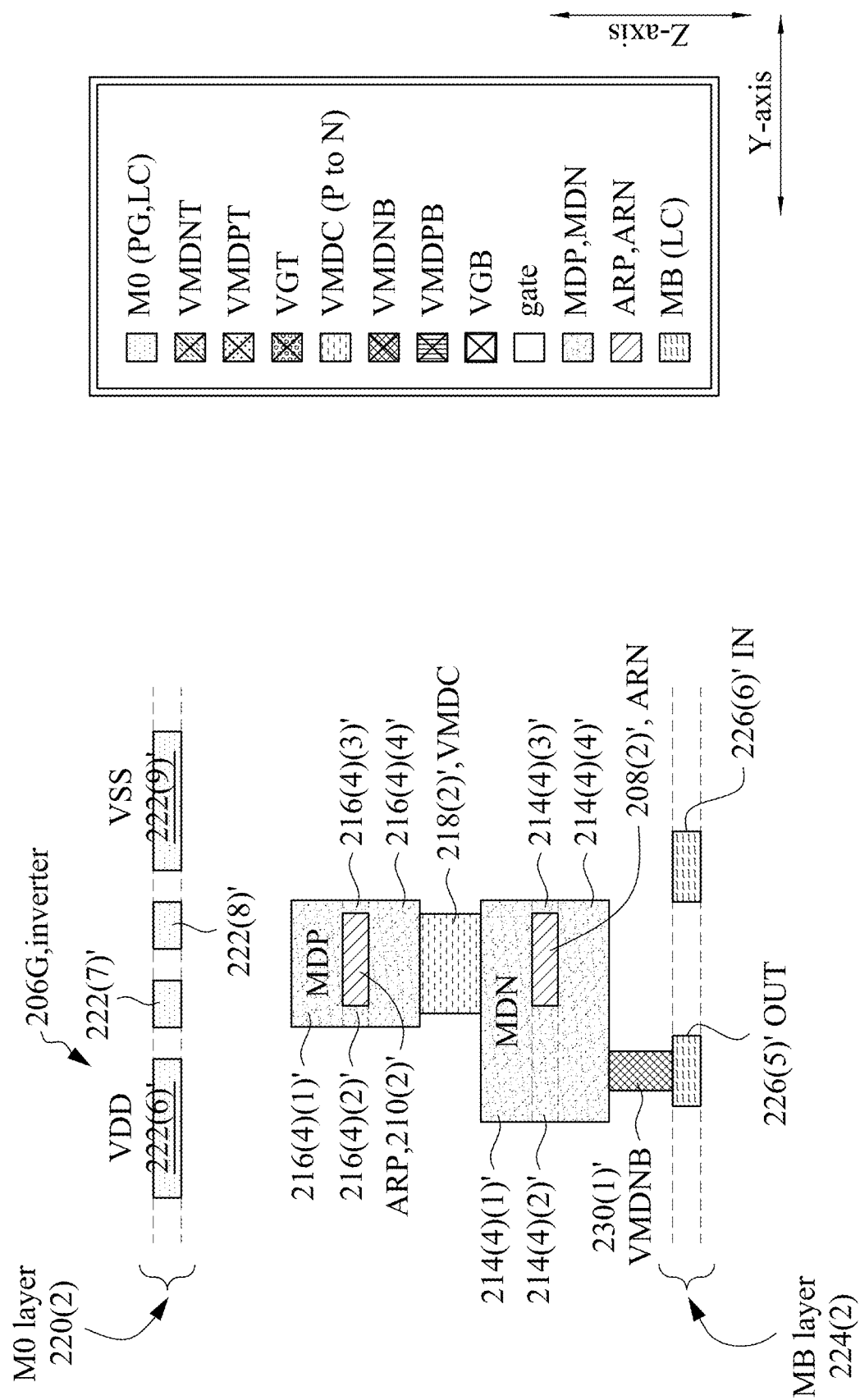

FIGS. 2E, 2F and 2G are corresponding cross sections 206E, 206F and 206G of a semiconductor device based on layout diagrams 206C and 206D, the semiconductor device including BLC CFETs, in accordance with some embodiments.

Layout diagrams 206C-206D of FIGS. 2C-2D and corresponding cross sections 206E-206G of FIGS. 2E-2G follow a numbering convention similar to that used in FIG. 2B. For example, FIGS. 2E-2F use 2-series numbers as does FIG. 2B. To help identify components which correspond but nevertheless have differences, the numbering convention of FIGS. 2B-2G appends a parenthetical to elements. For example, active area pattern 208(2) in layout diagram 206C of FIG. 2C represents ARN region 208(2)' in inverter cross sections 206E-206G of corresponding FIGS. 2E-2F, where active area pattern 208(2) and ARN region 208(2)' correspond to ARN region 208(1) in FIG. 2A, and where a difference between elements 208(2) and 208(2)' in corresponding FIGS. 2C and 2E-2G and element 208(1) in FIG. 2B is reflected by the former using the parenthetical (2) and the latter using the parenthetical (1). It is noted that the use of the apostrophe in the alphanumeric string 208(2)' indicates a difference with respect to the alphanumeric string 208(2), namely that element 208(2)' represents a structure in a semiconductor device whereas element 208(2) is pattern in a layout diagram. For brevity, the discussion will focus more on differences between FIGS. 2C-2G and FIG. 2B than on similarities.

More particularly, the semiconductor of cross sections 206E-206G of corresponding FIGS. 2E-2G, and the representation of the same by layout diagrams 206C-206D of FIGS. 2C and 2D, is a semiconductor device which is an inverter corresponding to inverter 206A of FIG. 2A.

Included among the differences between FIGS. 2C-2G and FIG. 2A, the inverter of FIGS. 2C-2G uses first and second buried logic conductors correspondingly to conduct the input signal, I, and the output signal, ZN, whereas inverter 206B of FIG. 2B uses logic conductors 322(3) and 322(2) in M0 layer 220(1) correspondingly to conduct signals I and ZN.

In general, layout diagrams are two dimensional top views which assume first and second substantially orthogonal directions, e.g., corresponding to the X-axis and Y-axis. Accordingly, a pattern in a layout diagram represents an upper surface of a structure based on the layout diagram. In general, layout diagrams include one or more overlapping patterns. For example, consider first and second patterns in a given layout diagram which represent corresponding first and second structures in a semiconductor device based on the given layout diagram. If the second pattern overlaps the first pattern, then this indicates that the second structure overlies the first structure in the semiconductor device relative to the Z-axis.

As noted, the inverter which layout diagrams 206C and 206D of corresponding FIGS. 2C and 2D represent includes BLC CFETs. Layout diagrams 206C-206D assume the X-axis and Y-axis as the corresponding first and second substantially orthogonal directions. Again, among other things, a BLC CFET includes a stack of first and second active regions arranged according to a typical CFET-type configuration in which the second active region is stacked over the first active region. Relative to the Z-axis, patterns in layout diagram 206C represent structures in the inverter which are proximal to a location along the Z-axis of the first active region in the inverter. Relative to the Z-axis, patterns in layout diagram 206D represent structures in the inverter which are proximal to a location along the Z-axis of the second active region in the inverter.

In light of their relationships, inverter layout diagrams 206C-206D and inverter cross sections 206E-206G, will be discussed together. Cross section indicator II(E)-II(E)' in FIGS. 2C-2D shows the corresponding relationships to FIG. 2E. Cross section indicator II(F)-II(F)' in FIGS. 2C-2D shows the corresponding relationships to FIG. 2F. Cross section indicator II(G)-II(G)' in FIGS. 2C-2D shows the corresponding relationships to FIG. 2G.

In FIG. 2C, inverter layout diagram 206C has a cell boundary 207C. Inverter layout diagram 206C includes: LC patterns 226(5) and 226(6) which are non-overlapping of each other relative to the Y-axis and correspond to logic conductors (LC) 226(5)' and 226(6)' in MB layer 224(4) of FIGS. 2E-2G; a VMDNB pattern 230(1) over LC pattern 226(5) and corresponding to a via structure 230(1) in FIG. 2G which electrically couples logic conductor 226(5)' and MDN contact structure portion 214(4)(1)', and wherein via structure 230(1)' is referred to herein as VMDNT structure 236(1); VGB pattern 228(1) over LC pattern 226(6) corresponding to a via structure 228(1)' in FIG. 2F which electrically couples logic conductor 226(6)' and gate structure 212(3)(1)'; active area (AA) pattern 208(2) designated for NMOS configuration and corresponding to ARN region 208(2)' of FIGS. 2E-2G, and hereinafter referred to as AAN pattern 208(2); MDN patterns 214(3)(1) and 214(3)(1) overlying AAN pattern 208(2) which are non-overlapping of each other relative to the X-axis and which correspond to MDN contact structure portions 214(3)(1)' and 214(4)(1)' in FIGS. 2E and 2G; gate patterns 212(2)(1), 212(3)(1) and 212(4)(1) over AAN pattern 208(2) which are non-overlapping of each other relative to the X-axis, where gate pattern 212(3)(1) corresponds to gate structure portion 212(3)(1)' in FIG. 2F; VDMC pattern 218(2) over MDN pattern 214(4)(1) and corresponding to VDMC structure 218(2)' in FIG. 2G; and VMDNT pattern 236(2) over MDN pattern 214(3)(1) and corresponding to VMDNT structure 236(2)' in FIG. 2E.

LC patterns 226(6) and 226(5) in FIG. 2C are designated for corresponding signals I and ZN. Logical conductors 226(6)' and 226(5)' in FIGS. 2E-2G conduct corresponding signals I and ZN.

Long axes of LC patterns 226(5)-226(6) and AAN pattern 208(2) extend substantially parallel to the X-axis. Long axes of gate patterns 212(2)(1), 212(3)(1) and 212(4)(1) and MDN patterns 214(3)(1) and 214(4)(1) extend substantially parallel to the Y-axis.

In FIGS. 2E-2F: MDN contact structure portion 214(3)(1)' is a part of a larger MDN contact structure which further includes contact structure portions 214(3)(2)', 214(3)(3)' and 214(3)(4)'; MDN contact structure portion 214(4)(1)' is a part of a larger MDN contact structure which further includes contact structure portions 214(4)(2)', 214(4)(3)' and 214(4)(4); and gate structure portion 212(3)(1)' is part of a larger gate structure which further includes 212(3)(1)', 212(3)(2)', 212(3)(3)', '212(3)(4)', '212(3)(5)', '212(3)(6)', and 212(3)(7)'.

In FIG. 2D, inverter layout diagram 206D has a cell boundary 207D. Layout diagram 206D includes: active area (AA) pattern 210(2) designated for PMOS configuration and corresponding to ARP region 210(2)' of FIGS. 2E-2G, and hereinafter referred to as AAP pattern 210(2); gate patterns 212(2)(2), 212(3)(2) and 212(4)(2) over AAP pattern 210(2) which are non-overlapping of each other relative to the X-axis, and where gate pattern 212(3)(2) corresponds to gate structure portion 212(3)(1)' in FIG. 2F; MDP patterns 216(3)(1) and 216(4)(1) overlying AAP pattern 210(2) which are non-overlapping of each other relative to the X-axis and which correspond to MDP contact structure portions 216(3)(1)' and 216(4)(1)' in FIGS. 2E and 2G; VMDNT pattern 236(2); VMDPT pattern 238(3) corresponding to VMDPT structure 238(3)' in FIG. 2E; PG patterns 222(6) and 222(9) corresponding to PG conductors 226(6)' and 222(9)' in M0 layer 220(2) in FIGS. 2E-2G; and LC patterns 222(7) and 222(8) corresponding to LC conductors 222(7)' and 222(8)' in M0 layer 220(2) in FIGS. 2E-2G.

Long axes of AAP pattern 210(2), PG patterns 222(6) and 222(9), and LC patterns 222(7) and 222(8) extend substantially parallel to the X-axis. Long axes of gate patterns 212(2)(2), 212(3)(2) and 212(4)(2) and MDP patterns 216(3)(1) and 216(4)(1) extend substantially parallel to the Y-axis.

Compared to another approach for a CFET-based inverter which does not include a layer of metallization under each CFET's stack of active regions, and instead uses logic conductors in the M0 layer to conduct signals I and ZN, the inverter of layout diagrams 206C-206D and corresponding cross sections 206E-206G has a benefit of providing an increased routing resource in M0 layer 220(2). More particularly, the routing resource in the M0 layer which is consumed for conducting signals I and ZN according to the other approach is available in the inverter of layout diagrams 206C-206D and corresponding cross sections 206E-206G because signals I and ZN are conducted by corresponding LC conductors 226(6)' and 226(5)' in MB layer 224(2).

Figure 3A:
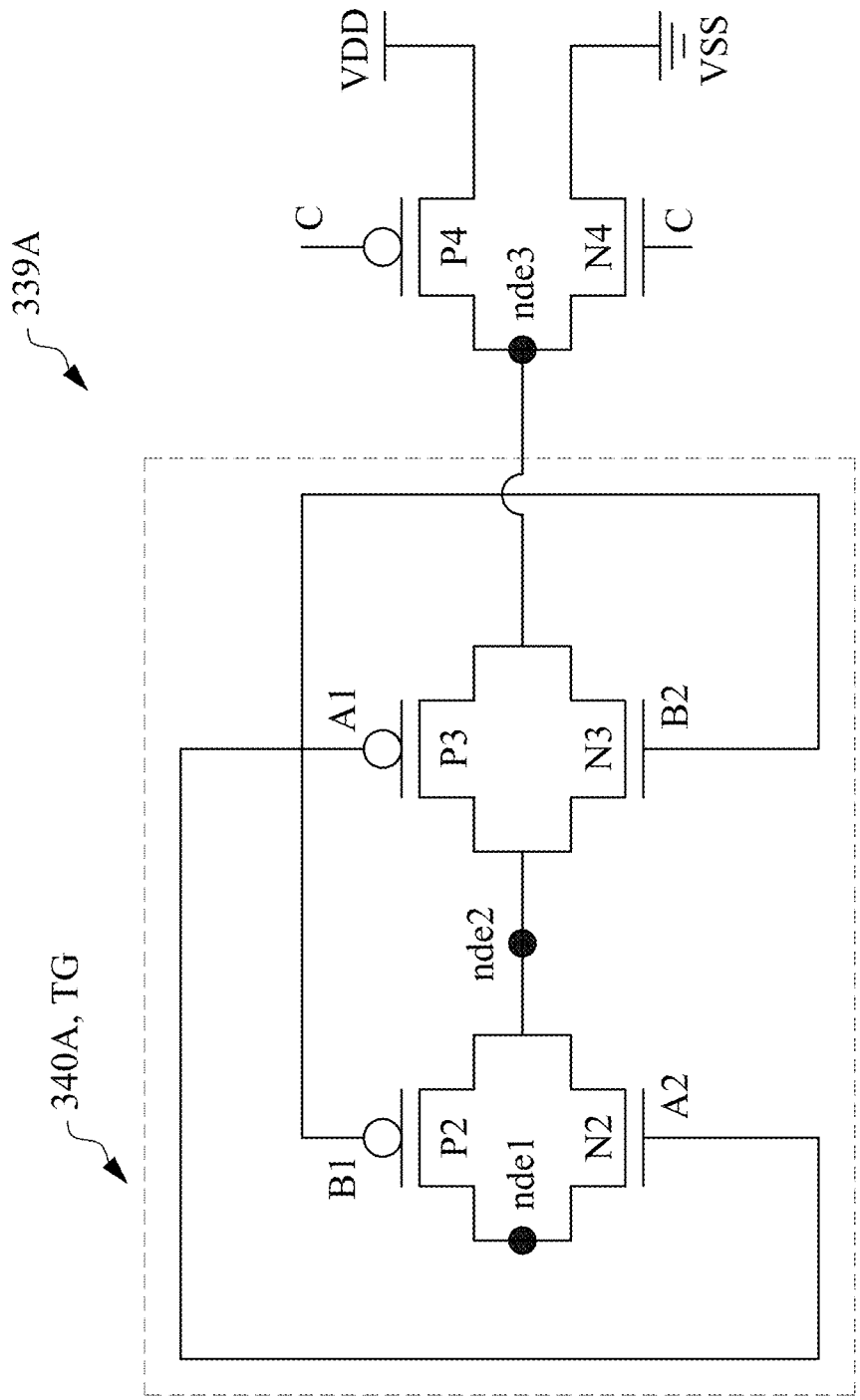
FIG. 3A is a circuit diagram, in accordance with some embodiments.

FIG. 3A is a circuit diagram of a transmission system 339A including a transmission gate 340A, in accordance with some embodiments.

Transmission system 339A includes PMOS transistors P2-P4 and N2-N4. Transmission gate (TG) 340A includes PMOS transistors P2-P3 and N2-N3. Transistors P2 and N2 are coupled in parallel between nodes nde1 and nde2, where node nde1 represents the input of transmission system 339A. Transistors P3 and N3 are coupled in parallel between nodes nde2 and nde3, where node nd3 represents an output of transmission system 339A. Gate terminals of transistors P2 and N3 are coupled together, with the gate terminal of transistor P2 being labeled with signal B1 and the gate terminal of transistor N2 being labeled with signal B2, where B1=B2. Gate terminals of transistors P3 and N2 are coupled together, with the gate terminal of transistor P3 being labeled with signal A1 and the gate terminal of transistor N2 being labeled with signal A2, where A1=A2. Transistor P4 is coupled between node nde3 and VDD. Transistor N4 is coupled between node nde3 and VSS. The gate terminals of transistors P4 and N4 receive control signal C.

FIGS. 3B(a) and 3C(a) are corresponding layout diagrams 340B(a) and 340C(a) representing a semiconductor device which includes BLC CFETs, in accordance with some embodiments.

FIGS. 3B(b), 3B(c), 3B(d) 3B(e), 3B(f), 3B(g) and 3B(h) are corresponding layout diagram variations 340(b), 340(c), 340(d) 340(e), 340(f), 340(g) and 340(h) of layout diagram 340B(a) of FIG. 3B(a), in accordance with some embodiments.

FIGS. 3C(b), 3C(c), 3C(d) 3C(e), 3C(f), 3C(g) and 3C(h) are corresponding layout diagram variations 340C(b), 340C(c), 340C(d) 340C(e), 340C(f), 340C(g) and 340C(h) of layout diagram 340C(a) of FIG. 3C(a), in accordance with some embodiments.

FIGS. 3D, 3E, 3F, 3G and 3H are corresponding cross sections 340D, 340E, 340F, 340G and 340H of a semiconductor device based on layout diagrams 3B(a) and 3C(a), the semiconductor device including BLC CFETs, in accordance with some embodiments.

The layout diagrams of FIGS. 3B(a), 3B(b), 3B(c), 3B(d), 3B(e), 3B(f), 3B(g) and 3B(h), 3C(a), 3C(b), 3C(c), 3C(d) 3C(e), 3C(f), 3C(g) and 3C(h), and the corresponding cross sections of FIGS. 3D-3H follow a numbering convention similar to that used in layout diagrams 206C-206D of FIGS. 2C-2D and corresponding cross sections 206E-206G of FIGS. 2E-2G. To help identify components which correspond but nevertheless have differences, the layout diagrams of FIGS. 3B(a), 3B(b), 3B(c), 3B(d) 3B(e), 3B(f), 3B(g) and 3B(h), 3C(a), 3C(b), 3C(c), 3C(d) 3C(e), 3C(f), 3C(g) and 3C(h), and the corresponding cross sections of FIGS. 3D-3H use 3-series numbers, whereas layout diagrams 206C-206D of FIGS. 2C-2D and corresponding cross sections 206E-206G of FIGS. 2E-2G use 2-series numbers. For brevity, the discussion will focus more on differences between FIGS. 2C-2G and FIG. 2B than on similarities.

More particularly, the semiconductor of cross sections of corresponding FIGS. 3D-3H, and the representation of the same by layout diagrams 340B(a) and 340C(a) of corresponding FIGS. 3B(a) and 3C(a), and the representation of variations of the same by the layout diagrams of corresponding FIGS. 3B(b), 3B(c), 3B(d) 3B(e), 3B(f), 3B(g) and 3B(h), 3C(b), 3C(c), 3C(d) 3C(e), 3C(f), 3C(g) and 3C(h), is a semiconductor device which is a transmission gate corresponding to transmission gate 340A of FIG. 3A.

In light of their relationships, transmission gate layout diagrams 340B(a) and 340C(a) of corresponding FIGS. 3B(a) and 3C(a) and transmission gate cross sections 206E-206G, 340D-340H of corresponding FIGS. 3D-3H, will be discussed together. As a result, FIGS. 3D-3H will be discussed in detail before FIGS. 3B(c), 3B(d) 3B(e), 3B(f), 3B(g) and 3B(h), and 3C(b), 3C(c), 3C(d) 3C(e), 3C(f), 3C(g) and 3C(h), are discussed in detail.

Figure 3D:
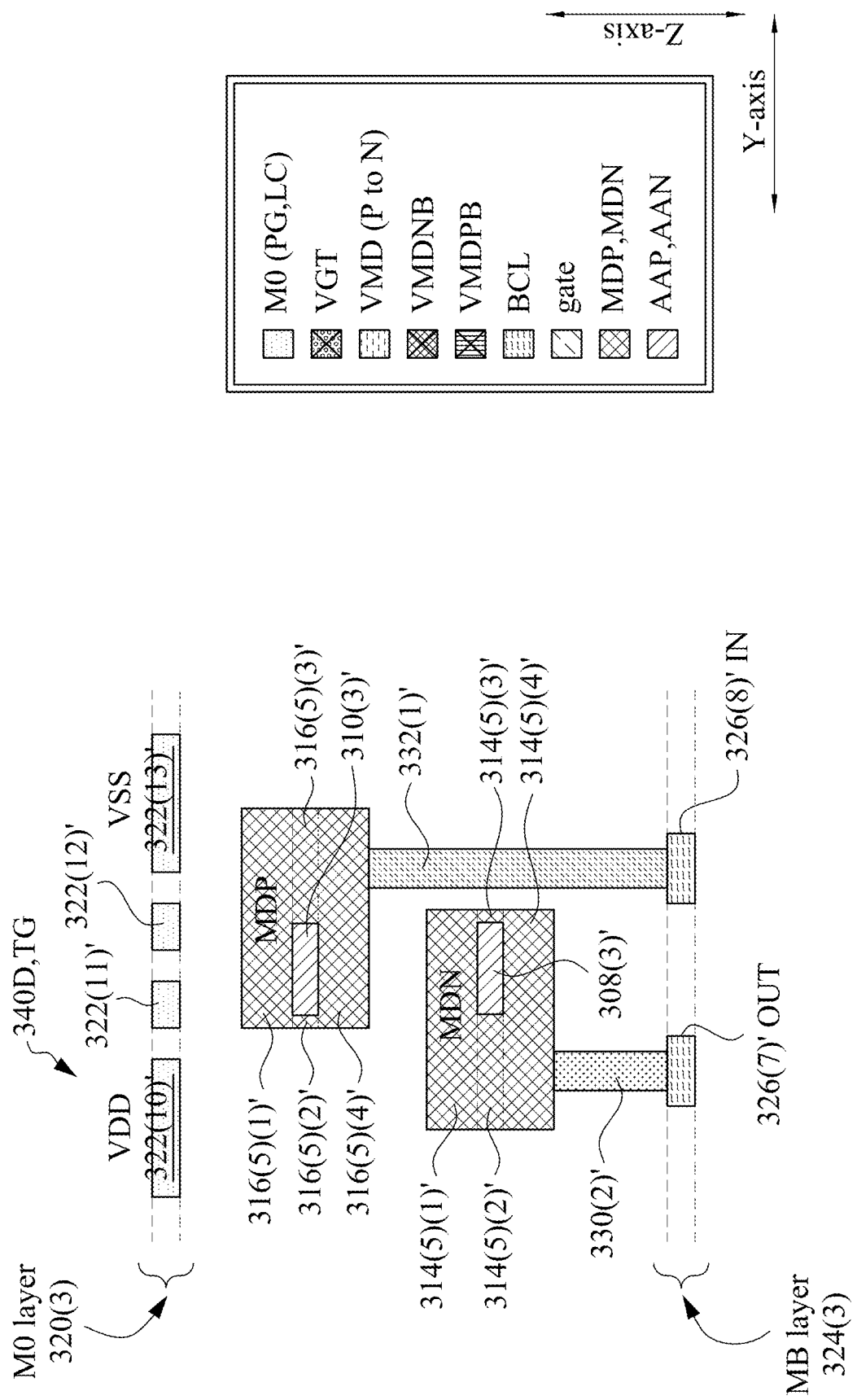
FIGS. 3D-3H are corresponding cross sections of a semiconductor device based on layout diagrams FIGS. 3B(a) and 3C(a), in accordance with some embodiments.
Figure 3E:
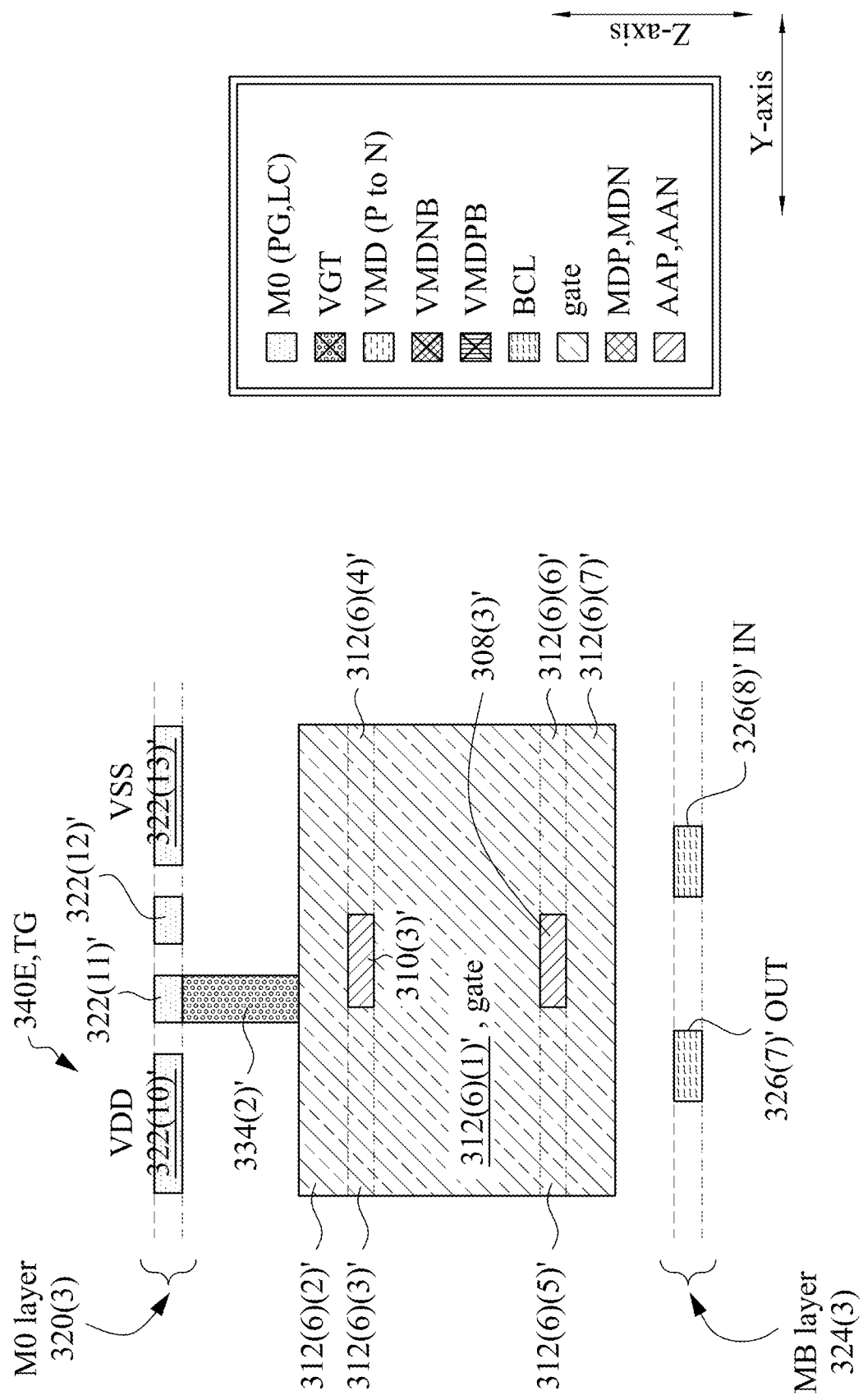

Cross section indicator III(D)-III(D)' in FIGS. 3B(a) and 3C(a) show the corresponding relationships to FIG. 3E. Cross section indicator III(E)-III(E)' in FIGS. 3B(a) and 3C(a) show the corresponding relationships to FIG. 3E. Cross section indicator III(F)-III(F)' in FIGS. 3B(a) and 3C(a) show the corresponding relationships to FIG. 3F. Cross section indicator III(G)-III(G)' in FIGS. 3B(a) and 3C(a) show the corresponding relationships to FIG. 3G. Cross section indicator III(H)-III(H)' in FIGS. 3B(a) and 3C(a) show the corresponding relationships to FIG. 3H.

In FIG. 3B(a), transmission gate layout diagram 340B(a) has a cell boundary 307B(a). Transmission gate layout diagram 340B(a) includes: LC patterns 326(7) and 326(8) which are non-overlapping of each other relative to the Y-axis and correspond to logic conductors (LC) 326(7)' and 326(8)' in MB layer 334(4) of FIGS. 3D-3H; a VMDNB pattern 330(2) over LC pattern 326(7) and corresponding to a via structure 330(2) in FIG. 3D which electrically couples logic conductor 326(7)' and MDN contact structure portion 314(5)(1)'; a VMDNB pattern 330(3) over LC pattern 326(8) and corresponding to a via structure 330(3) in FIG. 3H which electrically couples logic conductor 326(8)' and MDN contact structure portion 314(7)(1)'; a VMDPB pattern 332(1) over LC pattern 326(8) and corresponding to a via structure 330(1) in FIG. 2G which electrically couples logic conductor 326(8)' and MDP contact structure 316(5)(1)', and wherein via structure 332(1)' is referred to herein as VMDPB structure 332(1); a VMDPB pattern 332(2) over LC pattern 326(7) and corresponding to a via structure 330(2) in FIG. 3D which electrically couples logic conductor 326(7)' and MDP contact structure 316(7)(1)'; AAN pattern 308(3) which corresponds to ARN region 308(3)' of FIGS. 3D-3H; MDN patterns 314(5)(1), 314(6)(1) and 314(7)(1) overlying AAN pattern 308(3) which are non-overlapping of each other relative to the X-axis and which correspond to MDN contact structure portions 314(5)(1)', 314(6)(1)' and 314(7)(1)' in FIGS. 3D, 3F and 3H; gate patterns 313(5)(1), 313(6)(1), 313(7)(1) and 313(8)(1) and 313(8)(1) over AAN pattern 308(3) which are non-overlapping of each other relative to the X-axis, where gate patterns 313(6)(1) and 313(7)(1) correspond to gate structure portions 313(6)(1)' and 313(7)(1)' in FIGS. 3E and 3G; and VDMC pattern 318(3) over MDN pattern 314(6)(1) and corresponding to VDMC structure 318(3)' in FIG. 3F.

LC patterns 326(8) and 326(7) in FIG. 3B(a) are designated correspondingly for input signal I and output signal ZN. Logical conductors 326(8)' and 326(7)' in FIGS. 3D-3H conduct corresponding signals I and ZN.

Long axes of LC patterns 326(7)-326(8) and AAN pattern 308(3) extend substantially parallel to the X-axis. Long axes of gate patterns 312(5)(1), 312(6)(1), 321(7)(1) and 313(8)(1) and MDN patterns 314(5)(1) and 314(6)(1) extend substantially parallel to the Y-axis.

In FIGS. 3D-3H: MDN contact structure portion 314(5)(1)' is a part of a larger MDN contact structure which further includes contact structure portions 314(5)(2)', 314(5)(3)' and 314(5)(4)'; MDN contact structure portion 314(6)(1)' is a part of a larger MDN contact structure which further includes contact structure portions 314(6)(2)', 314(6)(3)' and 314(6)(4)'.

MDN contact structure portion 314(7)(1)' is a part of a larger MDN contact structure which further includes contact structure portions 314(7)(2)', 314(7)(3)' and 314(7)(4)'; gate structure portion 312(5)(1)' is part of a larger gate structure which further includes 312(5)(1)', 312(5)(2)', 312(5)(3)', '312(5)(4)', '312(5)(5)', '312(5)(6)', and 312(5)(7)'; gate structure portion 312(6)(1)' is part of a larger gate structure which further includes 312(6)(1)', 312(6)(2)', 312(6)(3)', '312(6)(4)', '312(6)(5)', '312(6)(6)', and 312(6)(7); gate structure portion 312(7)(1)' is part of a larger gate structure which further includes 312(7)(1)', 312(7)(2)', 312(7)(3)', '312(7)(4)', '312(7)(5)', '312(7)(6)', and 312(7)(7); and gate structure portion 312(8)(1)' is part of a larger gate structure which further includes 312(8)(1)', 312(8)(2)', 312 (8)(3)', '312(8)(4)', '312(8)(5)', '312(8)(6)', and 312(8)(7)'.

Figure 3F:
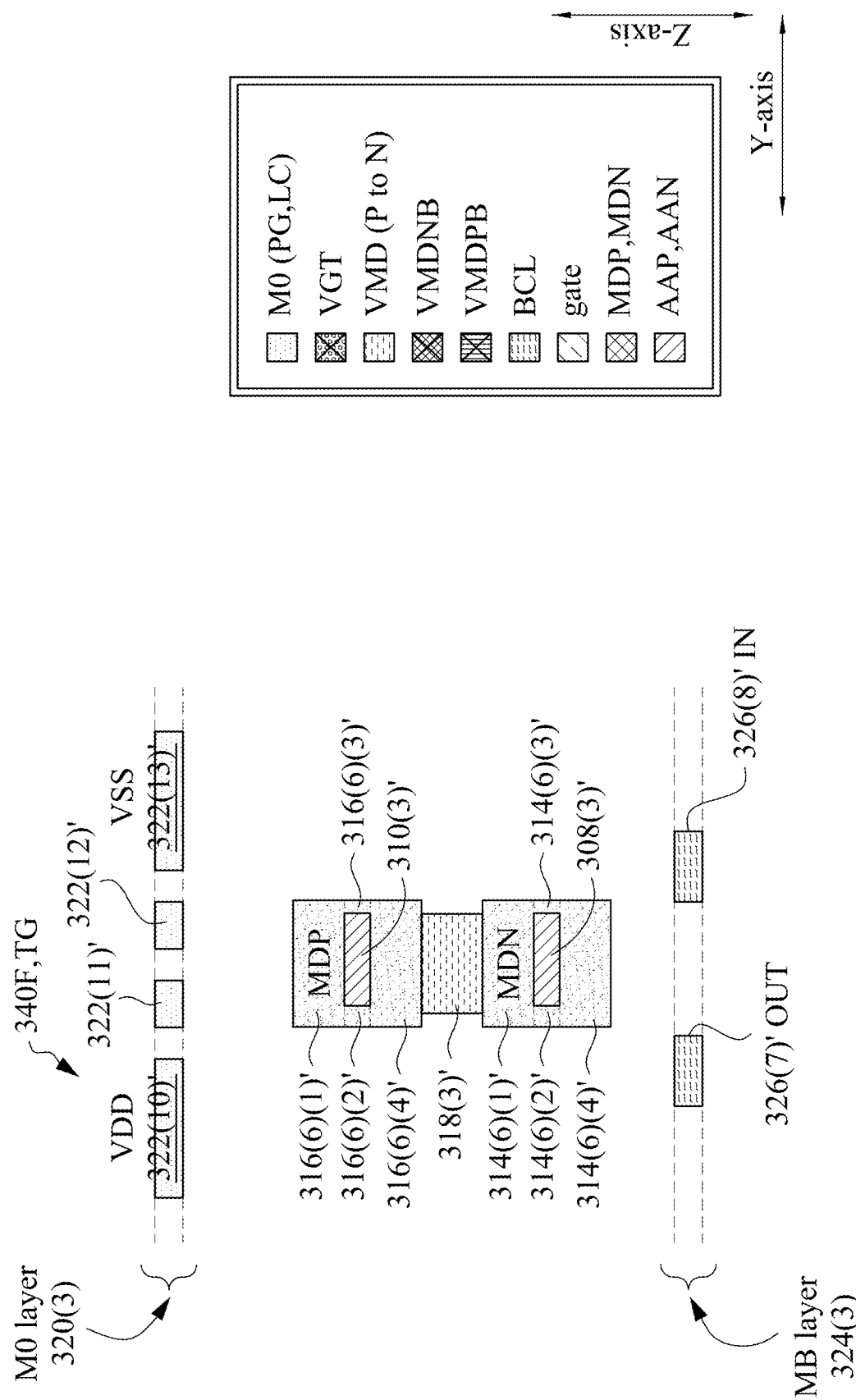
Figure 3G:
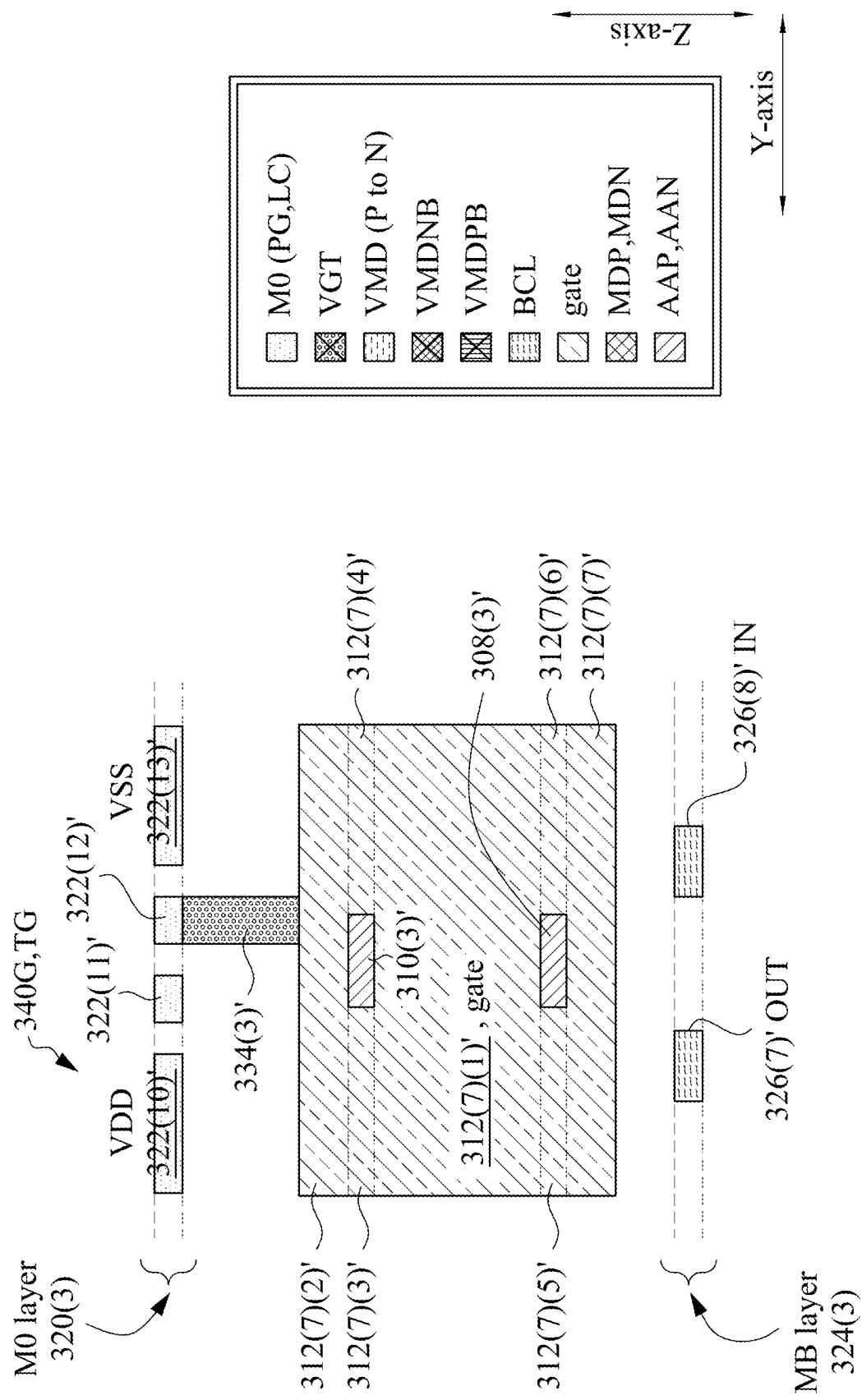
Figure 3H:
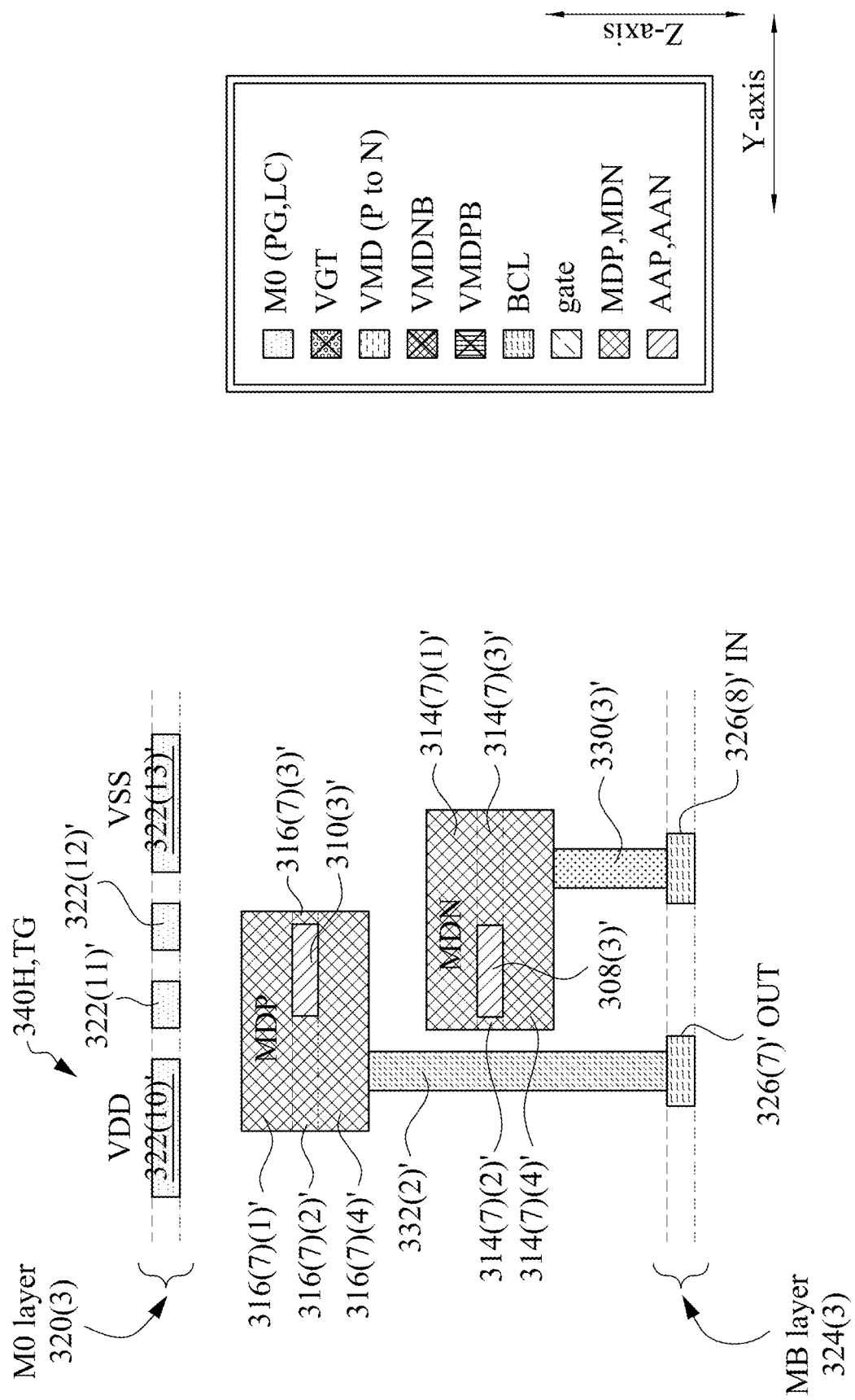

In FIG. 3C(a), transmission gate layout diagram 340C(a) has a cell boundary 307C(a). Transmission gate layout diagram 340C(a) includes: VMDPB patterns 332(1) and 332(2); AAP pattern 310(3) which corresponds to ARP region 310(3)' of FIGS. 3D-3H; gate patterns 312(5)(2), 312(6)(2), 312(7)(2) and 312(8)(2) over AAP pattern 310(3) which are non-overlapping of each other relative to the X-axis, and where gate patterns 312(6)(2) and 312(7)(2) correspond to gate structure portions 312(6)(2)' and 312(7)(2)' in FIGS. 3E and 3G;

MDP patterns 316(5)(1), 316(6)(1) and 316(7)(1) overlying AAP pattern 310(3) which are non-overlapping of each other relative to the X-axis and which correspond to MDP contact structure portions 316(6)(1)', 316(7)(1)' and 316(8)(1)' in FIGS. 3D, 3F and 3H; VMDPT pattern 328(3) corresponding to VMDPT structure 328(3)' in FIG. 2E; VGT pattern 334(2) over gate pattern 312(6)(2) corresponding to a via structure 312(6)(2)' in FIG. 3E which electrically couples gate structure 312(6)(2)' and logic conductor 322(11)'; VGT pattern 334(3) over gate pattern 312(7)(2) corresponding to a via structure 312(7)(2)' in FIG. 3G which electrically couples gate structure 312(7)(2)' and logic conductor 322(12)'; PG patterns 322(10) and 322(13) corresponding to PG conductors 322(10)' and 322(13)' in M0 layer 320(3) in FIGS. 3D-3H; and LC patterns 322(11) and 322(12) corresponding to LC conductors 322(11)' and 322(12)' in M0 layer 320(3) in FIGS. 3D-3H.

Long axes of AAP pattern 310(3), PG patterns 322(10) and 322(13), and LC patterns 322(11) and 322(12) extend substantially parallel to the X-axis. Long axes of gate patterns 312(5)(2), 312(6)(2), 312(7)(2) and 312(8)(2) and MDP patterns 316(5)(1), 316(6)(1) and 316(7)(1) extend substantially parallel to the Y-axis.

Compared to another approach for a CFET-based transmission gate which does not include a layer of metallization under each CFET's stack of active regions, and instead uses logic conductors in the M0 layer to conduct signals I and ZN, the transmission gate of layout diagrams 340B(a) and 340C(a) and corresponding cross sections 340D-340H has a benefit of providing an increased routing resource in M0 layer 320(3). More particularly, the routing resource in the M0 layer which is consumed for conducting signals I and ZN according to the other approach is available in the transmission gate of layout diagrams 340B(a) and 340C(a) and corresponding cross sections 340D-340H because signals I and ZN are conducted by corresponding LC conductors 326(8)' and 326(7)' in MB layer 334(3).

Again, FIGS. 3B(b) and 3C(b) are layout diagram variations of corresponding FIGS. 3B(a) and 3C(b), in accordance with some embodiments.

In FIG. 3B(b), layout diagram 340(B)(b) relocates portions 342B(a)(i) and 342B(a)(ii) of FIG. 3B(a) relative to the X-axis. In FIG. 3C(b), layout diagram 340(C)(b) relocates portions 342C(a)(i) and 342C(a)(ii) of FIG. 3C(a) relative to the X-axis.

Again, FIGS. 3B(c) and 3C(c) are layout diagram variations of corresponding FIGS. 3B(b) and 3C(b), in accordance with some embodiments.

In FIG. 3B(c), portions 342B(a)(i) and 342B(a)(ii) are shifted away from each other along the X-axis, thereby expanding layout diagram 340B(c) as compared to layout diagram 340B(b) of FIG. 3B(b). In FIG. 3C(c), portions 342C(a)(i) and 342C(a)(ii) are shifted away from each other along the X-axis, thereby expanding layout diagram 340C(c) as compared to layout diagram 340C(b) of FIG. 3C(b).

Again, FIGS. 3B(d) and 3C(d) are layout diagram variations of corresponding FIGS. 3B(c) and 3C(c), in accordance with some embodiments.

As compared to corresponding FIGS. 3B(c) and 3C(c), in FIGS. 3B(d) and 3C(d), VMDPB patterns of FIGS. 3B(c) & 3C(c) are eliminated and MDN patterns are correspondingly shortened relative to the Y-axis; and VGT patterns are located mirror-symmetrically about the long axis of the APN pattern.

Again, FIGS. 3B(e) and 3C(e) are layout diagram variations of corresponding FIGS. 3B(c) and 3C(c), in accordance with some embodiments.

As compared to corresponding FIGS. 3B(c) and 3C(c), in FIGS. 3B(e) and 3C(e), VMDNB patterns in portion 342B(a)(ii) of FIG. 3B(c) are located mirror-symmetrically about the long axes of the AAN pattern and the corresponding MDN patterns are adjusted accordingly resulting in a portion 342B(a)(ii)' which is a variation of portion 342B(a)(ii); and VMDPB patterns in portion 342C(a)(ii) of FIG. 3C(c) are located mirror-symmetrically about the long axis of the ANP pattern and the corresponding MDP patterns are adjusted accordingly resulting in a portion 342C(a)(ii)' which is a variation of portion 342C(a)(ii).

Again, FIGS. 3B(f) and 3C(f) are layout diagram variations of corresponding FIGS. 3B(c) and 3C(c), in accordance with some embodiments.

As compared to corresponding FIGS. 3B(a) and 3C(a), in FIGS. 3B(f) and 3C(g), portions 342B(a)(ii) and 342(C)(a)(ii) are expanded along the X-axis resulting in corresponding variation portions 342B(a)(ii)" and 342(C)(a)(ii)"; and VMDPT patterns are added to portion 342C(a)(ii)".

Again, FIGS. 3B(g) and 3C(g) are layout diagram variations of corresponding FIGS. 3B(c) and 3C(f), in accordance with some embodiments.

As compared to corresponding FIG. 3B(a), in FIG. 3B(g), portion 342B(b)(i) is expanded along the X-axis resulting in variation portion 342B(b)(i)'. Also, FIG. 3B(g) has a portion 342B(e)(i) borrowed from FIG. 3B(e). As compared to FIG. 3C(f), in FIG. 3C(g), portion 342C(f)(i) is expanded along the X-axis resulting in variation portion 342C(f)(i)';

Again, FIGS. 3B(h) and 3C(h) are corresponding cross sections of a semiconductor device, in accordance with some embodiments.

As compared to FIG. 3B(c), in FIG. 3B(h), portion 342(B)(c)(i) has been expanded along the X-axis, one of the VMDNB patterns has been removed and the corresponding MDN pattern has been correspondingly shortened along the Y-axis, resulting in portion 342B(c)(i)'. Also as compared to FIG. 3B(c), in FIG. 3B(h), portion 342(B)(c)(ii) of FIG. 3B(c) has been expanded along the X-axis, and one of the VMDNB patterns has been removed and the corresponding MDN pattern has been correspondingly shortened along the Y-axis, resulting portion 342B(c)(ii)'. As compared to FIG. 3C(g), in FIG. 3C(h), portion 342C(f)(i)' has been expanded along the X-axis resulting in portion 342C(f)(i)".

FIGS. 4A, 4B, 4C and 4D are offset sectional of corresponding semiconductor devices which are BLC CFETs, in accordance with some embodiments.

In an offset sectional view, the 'cutting plane' which produces the section is bent at right angles (or folded) so as to appear stepped or offset, which facilitates showing features that otherwise would be intersected by an unfolded cutting plane. More particularly, the offset sections of BLC CFETS 402C, 402D, 402E and 402F in corresponding FIGS. 4A, 4B, 4C and 4D are symbolic of MDP and MDN electrical coupling rather than being representative of structural arrangement.

Figure 4A:
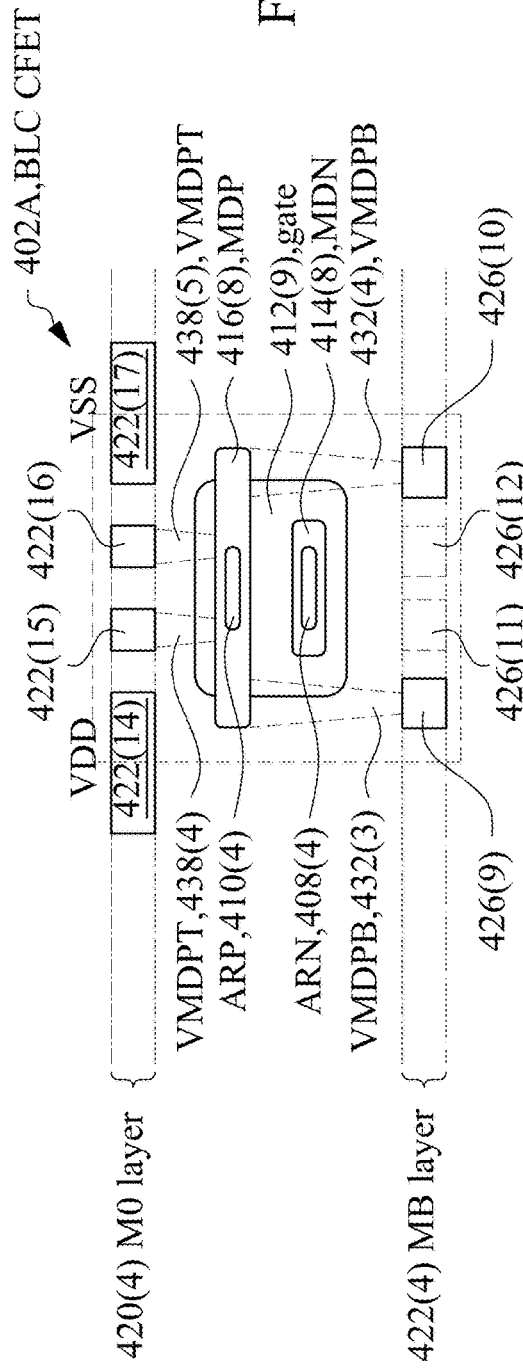
FIGS. 4A-4D are offset sectional views of corresponding semiconductor devices, in accordance with some embodiments.

In FIG. 4A, BLC CFET layout diagram 402A includes: logic conductors 426(9) and 426(10), and optional (as indicated by phantom (dashed) lines) logic conductors 426(11) and 426(12), in MB layer 422(4), and which are non-overlapping of each other relative to the Y-axis; VMDPB structures 432(3) and 43(4) over corresponding logic conductors 426(9) and 426(10); ARN region 410(4); ARN region 408(4); MDN contact structure 414(8); MDP contact structure 416(8); gate structure 412(9); VMDPT structures 438(4) and 438(5); PG conductors 422(14) and 422(17) and logic conductors 422(15) and 422(16) in M0 layer 420(4), and which are non-overlapping of each other, and where logic conductors 422(15) and 422(16) are over corresponding VMDPT structures 438(4) and 438(5).

Figure 4B:
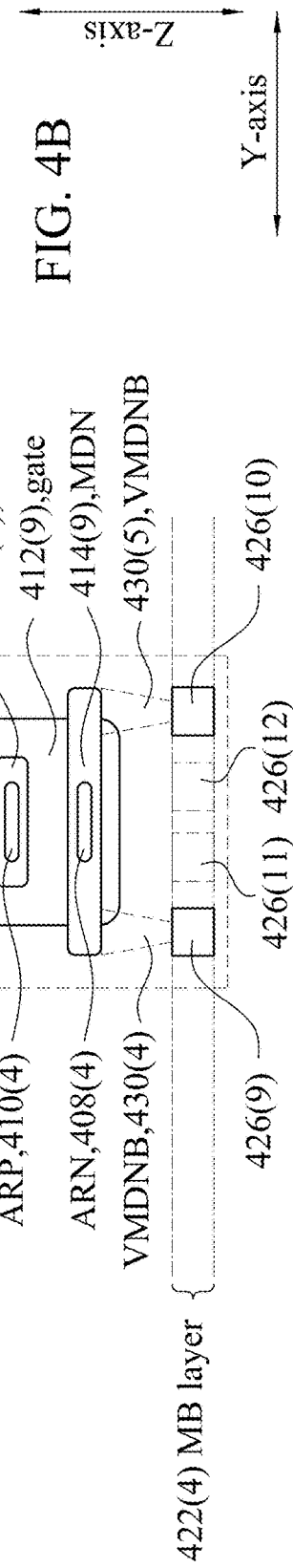

As compared to FIG. 4A, differences in FIG. 4B include: VMDPB structures 432(3) and 432(4) are eliminated and MDP contact structure 416(9) is correspondingly narrowed along the Y-axis; and VMDNB structures 430(4) and 430(5) are added and MDN contact structure 414(9) is correspondingly lengthened along the Y-axis.

Figure 4C:
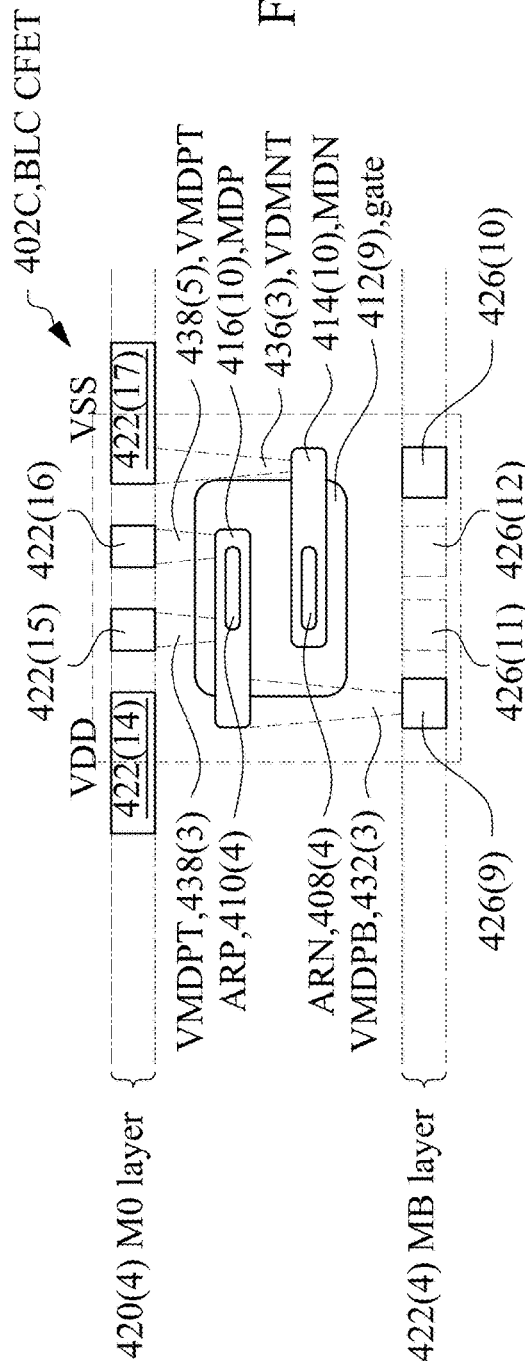

As compared to FIG. 4A, differences in FIG. 4C include: VMDPB structure 432(4) is eliminated and MDP contact structure 416(10) is correspondingly narrowed along the Y-axis; and VMDNT structure 436(3) is added and MDN contact structure 414(10) is correspondingly lengthened along the Y-axis.

Figure 4D:
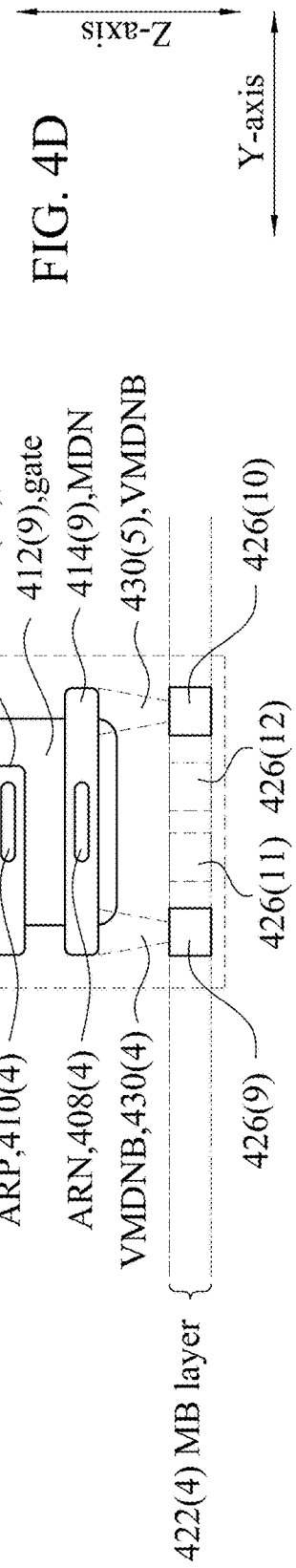

As compared to FIG. 4B, differences in FIG. 4D include: VMDPT structure 438(6) is added and MDP contact region 416(11) is correspondingly lengthened along the Y-axis.

Figure 5B:
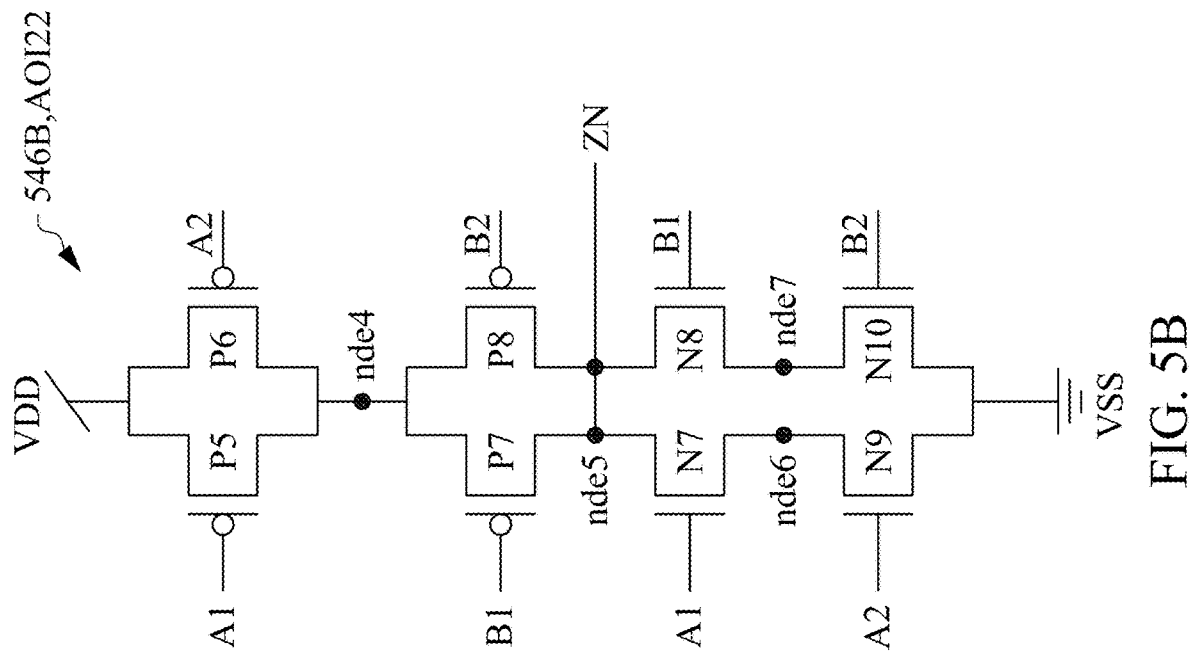
FIG. 5B is a circuit diagram, in accordance with some embodiments.
Figure 5A:
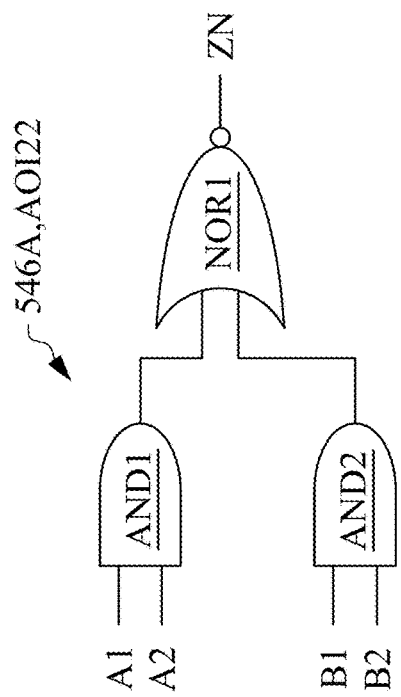
FIG. 5A is a logical block diagram, in accordance with some embodiments.

FIG. 5A is a logical block diagram 546A, in accordance with some embodiments.

In particular, circuit 546A is an AND-OR-INVERT (AOI) gate, and more particularly is an AOI22 gate (hereinafter AOI22 gate 546A). AOI22 546A includes; a first AND gate AND1 which receives inputs A1 and A2; a second AND gate AND2 which receives inputs B1 and B2; and a NOR gate NOR1 which receives the outputs of AND1 and AND2 and provides an output ZN, where ZN represents the output of AOI22. In the alphanumeric text string "AOI22," the numerical string "22" indicates that there are two sets of inputs at the first level or stage, where the first stage of AOI22 gate 546A includes two AND gates, namely AND1 gate and AND2 gate, and where each set includes two inputs. In some embodiments, AOI22 gate 546A has a drive strength of 1×, and is referred to as AOI22X1 or AOI22D1. In some embodiments, for a library of standard cells according to a corresponding semiconductor process technology node, a current-driving capability (drive strength) of 1× represents a drive strength of a minimum size inverter in the library of standard cells.

FIG. 5B is a circuit diagram of AOI22 circuit 546B, in accordance with some embodiments.

In FIG. 5B, AOI22 546B includes PMOS transistors P5, P6, P7 and P84, and NMOS transistors N7, N8, N9 and N10. Transistors P5 and P6 are coupled between VDD and node nde4. Transistors P7 and P8 are coupled between nodes nde4 and nde5. Node nde 5 provides output ZN. Transistor N7 is coupled between node nde5 and node nde6. Transistor N8 is coupled between node nde5 and node nde 7. Transistor N9 is coupled between node nde6 and VSS. Transistor N10 is coupled between node nde7 and VSS. Input signal A1 is provided on the gate terminals of transistors P5 and N7. Input signal A2 is provided on the gate terminals of transistors P6 and N9. Input signal B1 is provided on the gate terminals of transistors P7 and N8. Input signal B2 is provided on the gate terminals of transistors P8 and N10.

Figure 5D:
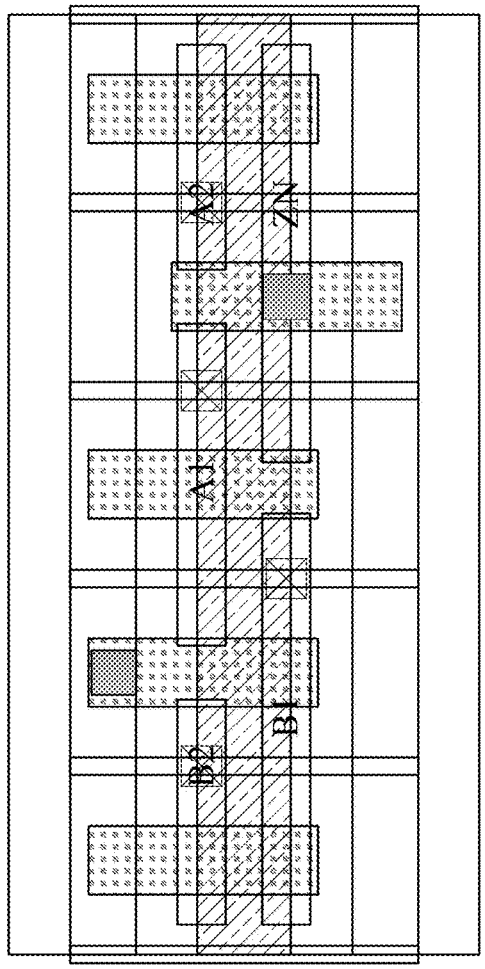
FIGS. 5C-5D are corresponding layout diagrams representing a semiconductor device, in accordance with some embodiments.
Figure 5C:
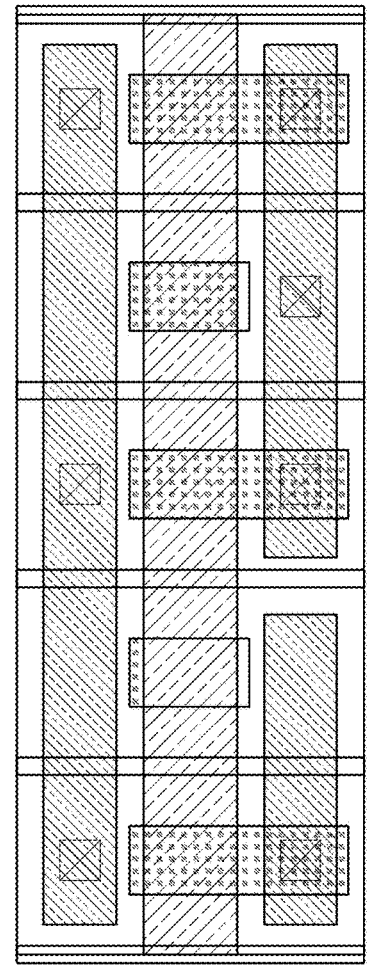

FIGS. 5C-5D are corresponding layout diagrams 546C and 546D representing AOI22 circuit 546B, in accordance with some embodiments.

AOI22 circuit 546B, which layout diagrams 546C and 546D of corresponding FIGS. 5C and 5D represent, includes BLC CFETs. Layout diagrams 546C-546D assume the X-axis and Y-axis as the corresponding first and second substantially orthogonal directions. Again, among other things, a BLC CFET includes a stack of first and second active regions arranged according to a typical CFET-type configuration in which the second active region is stacked over the first active region. Relative to the Z-axis, patterns in layout diagram 546C represent structures in AOI22 circuit 546B which are proximal to a location along the Z-axis of the first active region in AOI22 circuit 546B. Relative to the Z-axis, patterns in layout diagram 546D represent structures in AOI22 circuit 546B which are proximal to a location along the Z-axis of the second active region in the AOI22 circuit 546B.

Figure 5E:
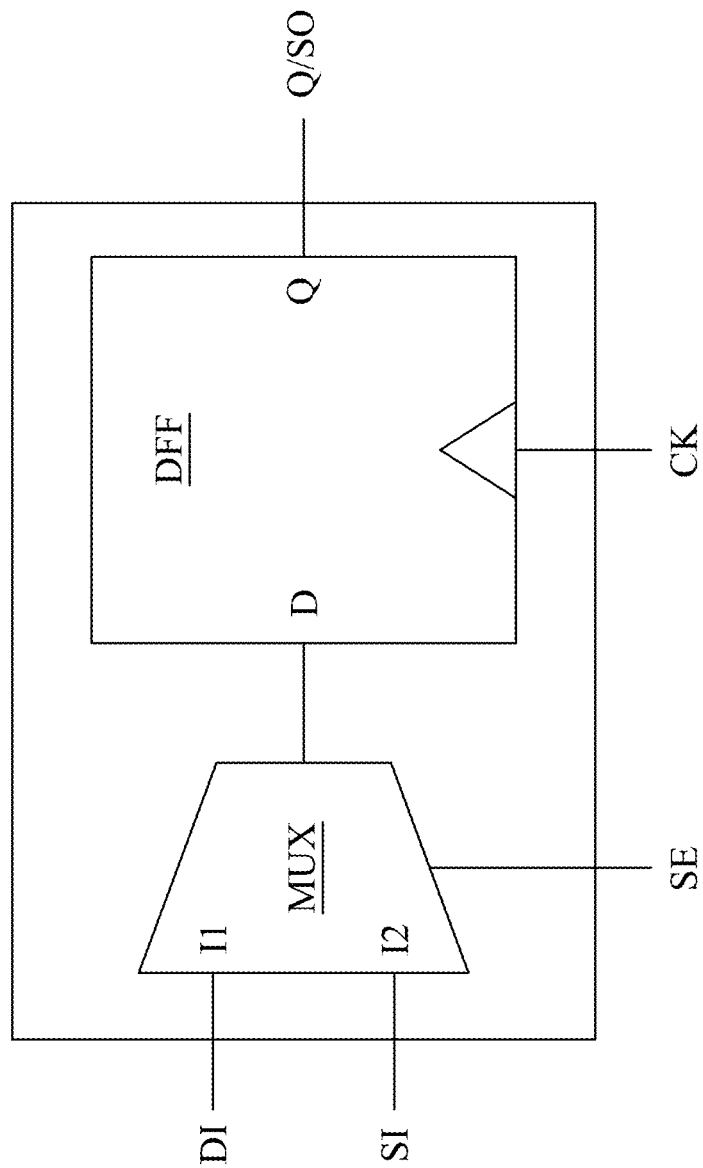
FIG. 5E is a logical block diagram, in accordance with some embodiments.
Figure 5F:
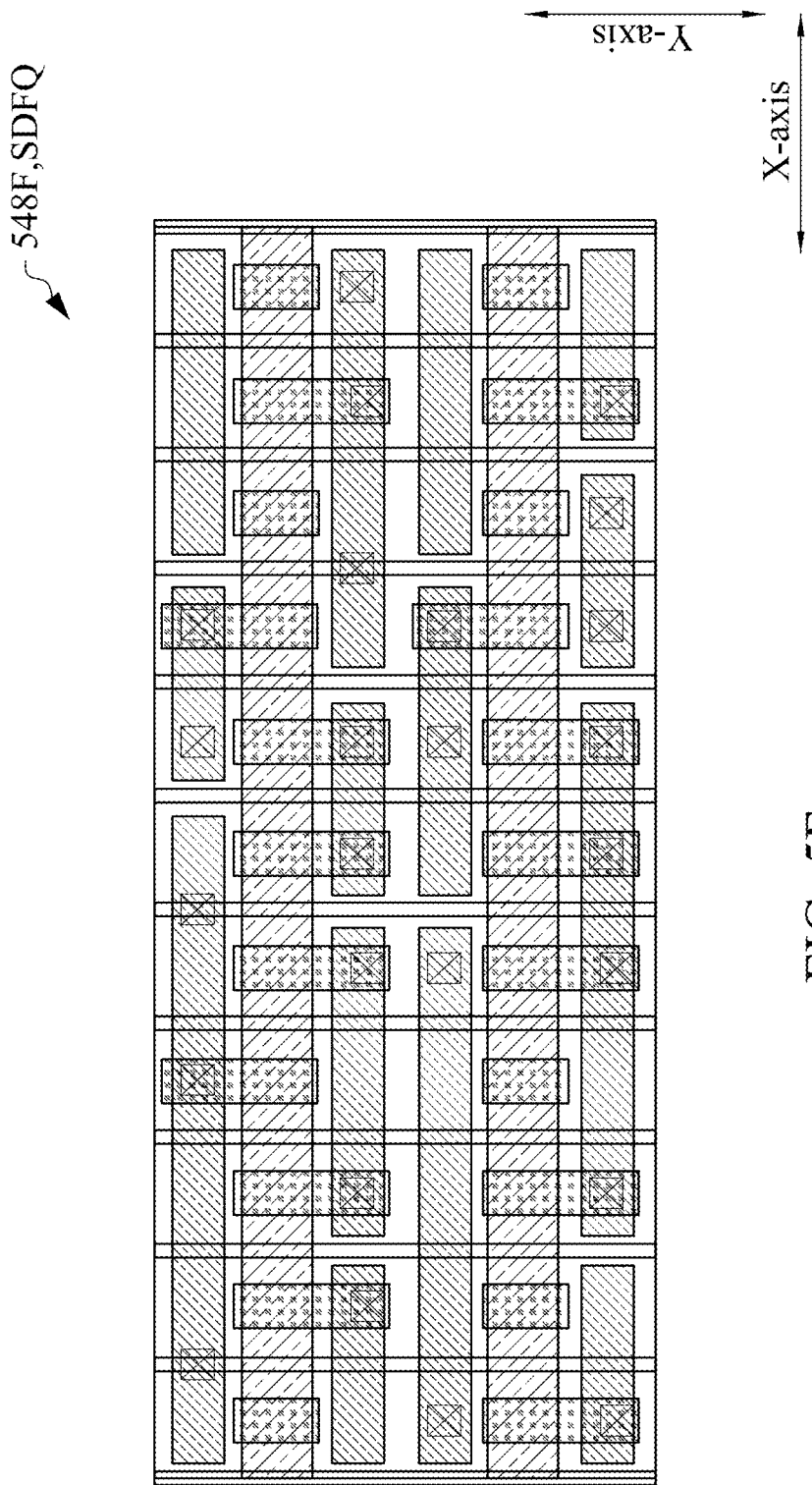
FIGS. 5F-5G are corresponding layout diagrams representing a semiconductor device, in accordance with some embodiments.
Figure 5G:
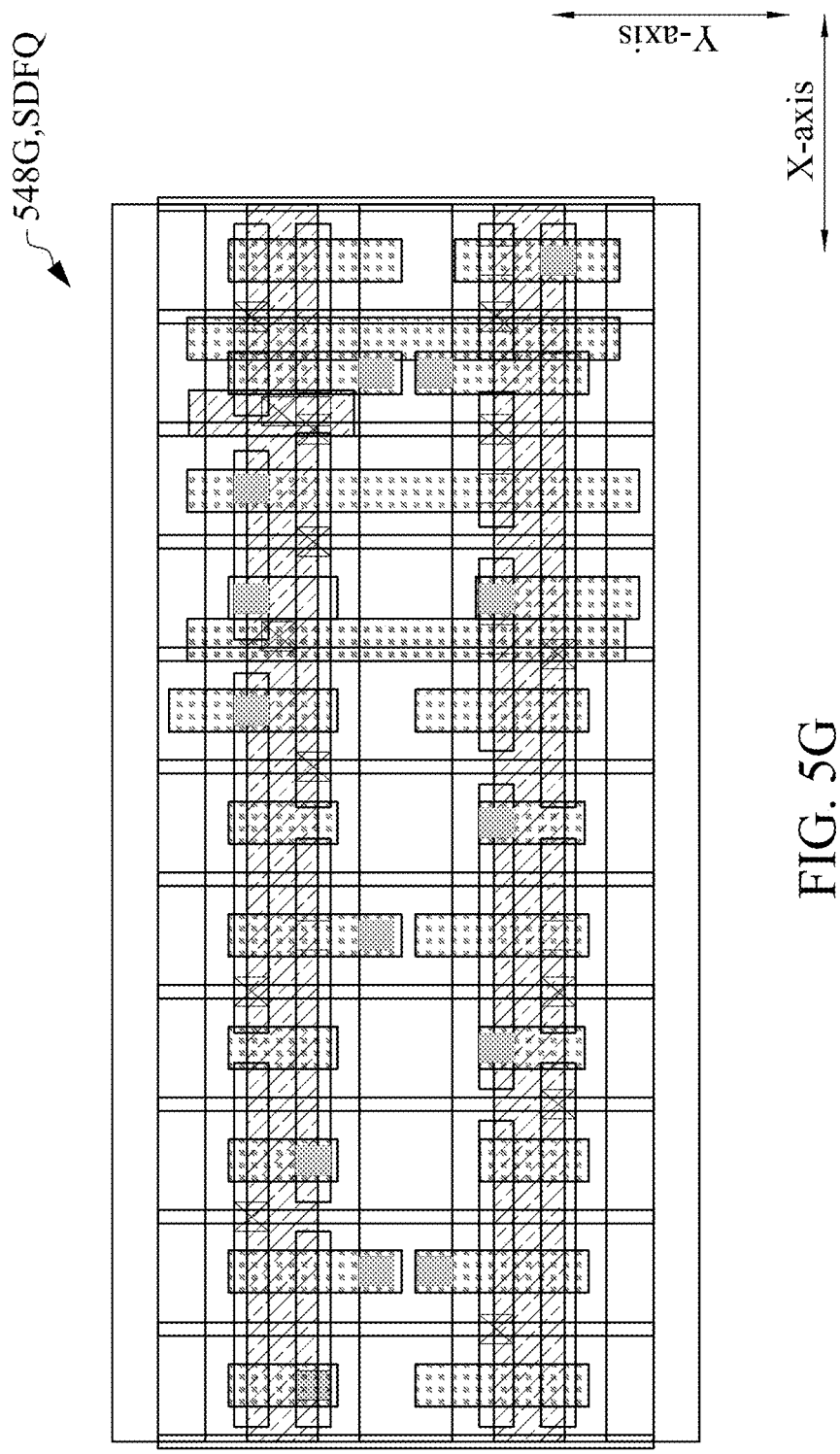

FIG. 5E is a block diagram of a scan D flip-flop (SDFQ) 548E, in accordance with some embodiments.

A basic D flip-flop receives a single data signal, D. SDFQ 548E is a type of D flip-flop (DFF) which is controllable to select either a data signal DI or a scan/test signal SI.

In FIG. 5B, SDFQ 548E includes a multiplexer MUX coupled to a D flip-flop DFF. Multiplexer MUX has data inputs I1 and I2 which correspondingly receive signals DI and SI, and a control input that receives scan/test enable signal SE. The output of multiplexer MUX is coupled to the input of D flip-flop DFF. D flip-flop DFF also receives clock signal CK. D flip-flop DFF outputs a signal Q when data signal DI is selected, and outputs a signal SO when test/scan signal SI is selected.

FIGS. 5C-5D are corresponding layout diagrams 548F and 548G representing SDFQ circuit 548E, in accordance with some embodiments.

SDFQ circuit 548E, which layout diagrams 548F and 548G of corresponding FIGS. 5C and 5D represent, includes BLC CFETs. Layout diagrams 548F-548G assume the X-axis and Y-axis as the corresponding first and second substantially orthogonal directions. Again, among other things, a BLC CFET includes a stack of first and second active regions arranged according to a typical CFET-type configuration in which the second active region is stacked over the first active region. Relative to the Z-axis, patterns in layout diagram 548F represent structures in SDFQ circuit 548E which are proximal to a location along the Z-axis of the first active region in SDFQ circuit 548E. Relative to the Z-axis, patterns in layout diagram 548G represent structures in SDFQ circuit 548E which are proximal to a location along the Z-axis of the second active region in the SDFQ circuit 548E.

Figure 6A:
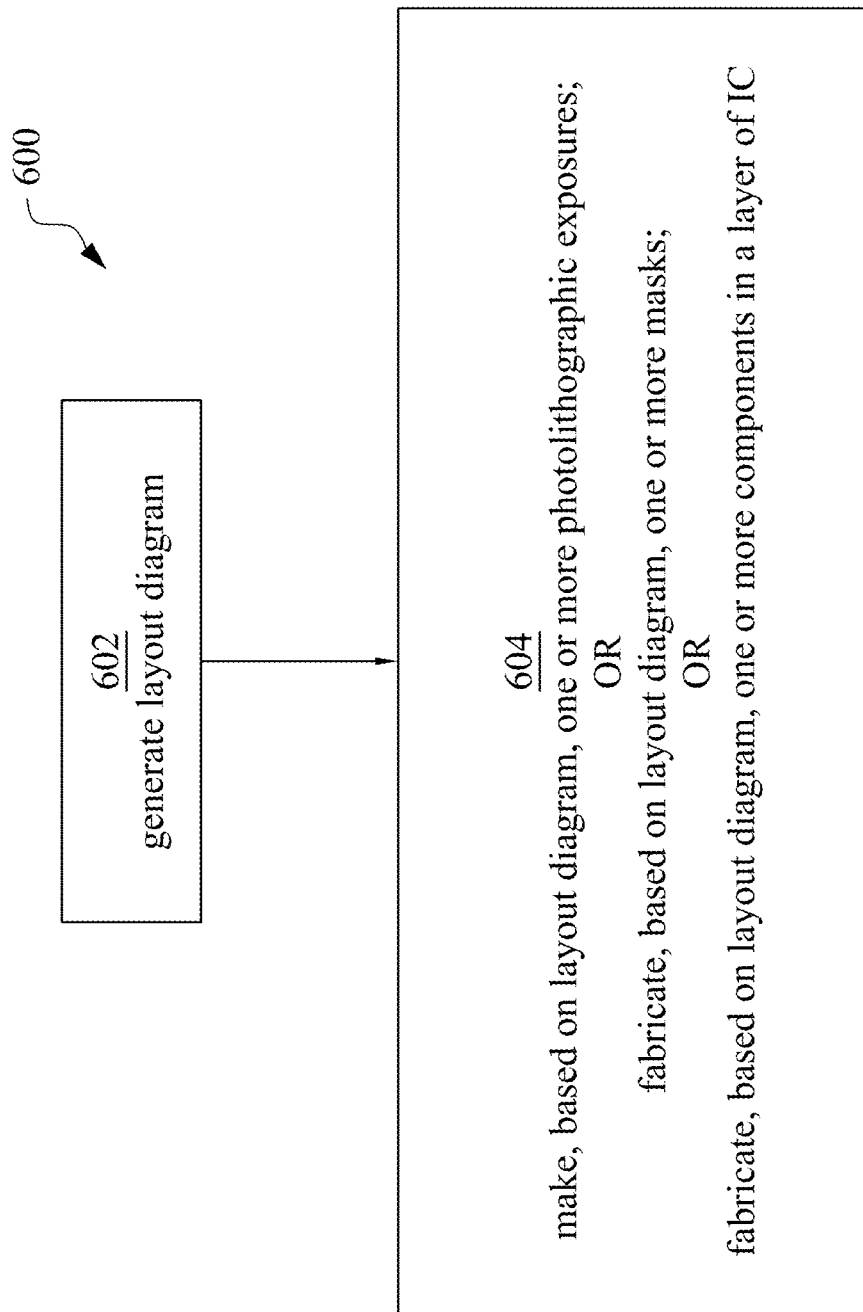
FIG. 6A is a flowchart of a method of manufacturing a semiconductor device, in accordance with some embodiments.

FIG. 6A is a flowchart of a method 600 of generating a layout diagram, in accordance with some embodiments.

Method 600 is implementable, for example, using EDA system 700 (FIG. 7, discussed below) and an integrated circuit (IC), manufacturing system 800 (FIG. 8, discussed below), in accordance with some embodiments. Regarding method 600, examples of the layout diagram include the layout diagrams disclosed herein, or the like. Examples of a semiconductor device which can be manufactured according to method 600 include semiconductor device 100 FIG. 1.

In FIG. 6, method 600 includes blocks 602-604. At block 602, a layout diagram is generated which, among other things, include patterns represent one or more BCL CFETs as disclosed herein, or the like. An example of a semiconductor device corresponding to a layout diagram generated by block 602 includes semiconductor device 100 of FIG. 1. Block 602 is discussed in more detail below with respect to FIGS. 6B-6D. From block 602, flow proceeds to block 604.

At block 604, based on the layout diagram, at least one of (A) one or more photolithographic exposures are made or (B) one or more semiconductor masks are fabricated or (C) one or more components in a layer of a semiconductor device are fabricated. See discussion below of FIG. 8.

Figure 6B:
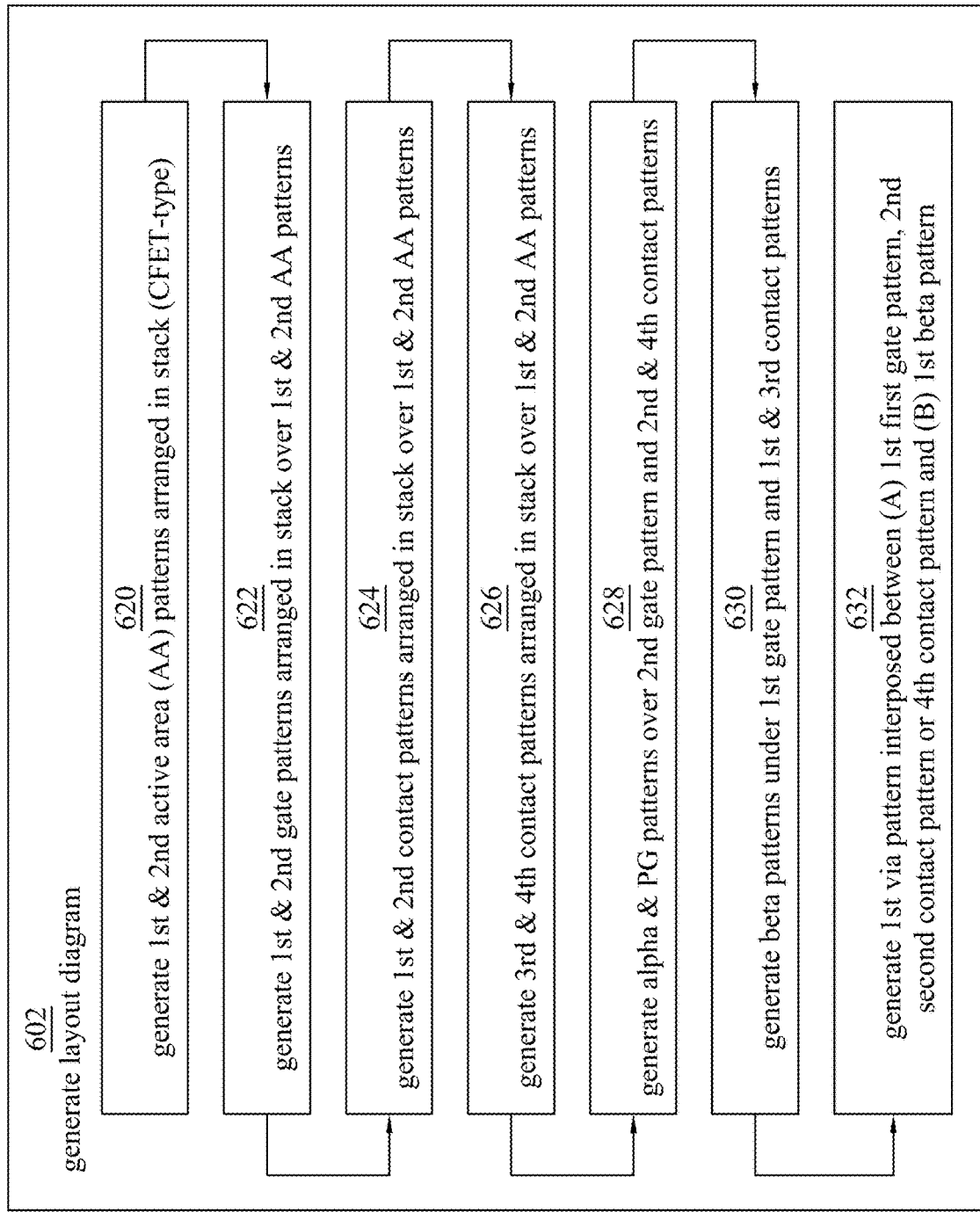
FIGS. 6B-6D are corresponding flowcharts of methods of generating a layout diagram, in accordance with some embodiments.

FIG. 6B is a flowchart of a method of generating a layout diagram, in accordance with some embodiments.

More particularly, the flowchart of FIG. 6B shows additional blocks included in block 602 of FIG. 6A, in accordance with one or more embodiments.

In FIG. 6B, block 602 includes blocks 620-632. At block 620, relative to a first direction, first and second active area (AA) patterns are generated and arranged in a first stack with the second AA pattern over the first AA pattern according to CFET-type configuration. An example of the first direction is the Z-axis. Examples of the first and second AA patterns include corresponding AAN pattern 208(2) and AAP pattern 210(2) of FIGS. 2C and 2D. From block 620, flow proceeds to block 622.

At block 622, first and second gate patterns are generated and arranged in second stack with the first gate pattern over the first AA pattern, and with the second gate pattern over the second AA pattern. Examples of the first and second gate patterns are corresponding gate patterns 212(3)(1) and 212(3)(2) of corresponding FIGS. 2C and 2D. From block 622, flow proceeds to block 624.

At block 624, first and second contact patterns are generated and arranged in a third stack with the second contact pattern over the first contact pattern. Examples of the first and second contact patterns are corresponding MDN pattern 214(3)(1) of FIG. 2C and MDP pattern 216(3)(1) of FIG. 2D. From block 624, flow proceeds to block 626.

At block 626, third and fourth contact patterns are generated and arranged in a fourth stack with the fourth contact pattern over the third contact pattern. Examples of the third and fourth contact patterns are corresponding MDN pattern 214(4)(1) of FIG. 2C and MDP pattern 216(4)(1) of FIG. 2D. From block 626, flow proceeds to block 628.

At block 628, alpha patterns and power grid (PG) patterns are generated which are correspondingly over the second gate pattern and the second and the fourth contact patterns, and which are non-overlapping of each other. Examples of the alpha patterns are LC patterns 222(7) and 222(8) in FIG. 2D, which represent corresponding logic conductors 222(7)' and 222(8)' in M0 layer 220(2) of FIGS. 2E-2G. Examples of the PG patterns are PG patterns 222(6) and 222(9) in FIG. 2D, which represent corresponding PG conductors 222(6)' and 222(9)' in M0 layer 220(2) of FIGS. 2E-2G. From block 628, flow proceeds to block 630.

At block 630, beta patterns are generated which are correspondingly under the first gate pattern and the first and the third contact patterns, and which are non-overlapping of each other. Examples of the beta patterns are LC patterns 226(5) and 226(6) in FIG. 2C, which represent corresponding logic conductors 226(5)' and 226(6)' in MB layer 224(2) of FIGS. 2E-2G. From block 630, flow proceeds to block 632.

At block 632, a first via pattern is generated which is interposed between (A) the first gate pattern, the second contact pattern or the fourth contact pattern and (B) a first one of the beta patterns. An example of the first via pattern is VGB 228(1) of FIG. 2C, and correspondingly an example of the first one of the beta patterns is LC pattern 226(6) of FIG. 2C. Another example of the first via pattern is VMDNB pattern 330(2) of FIG. 3B(a), and correspondingly another example of the first one of the beta patterns is LC pattern 326(7) of FIG. 3B(a).

Figure 6C:
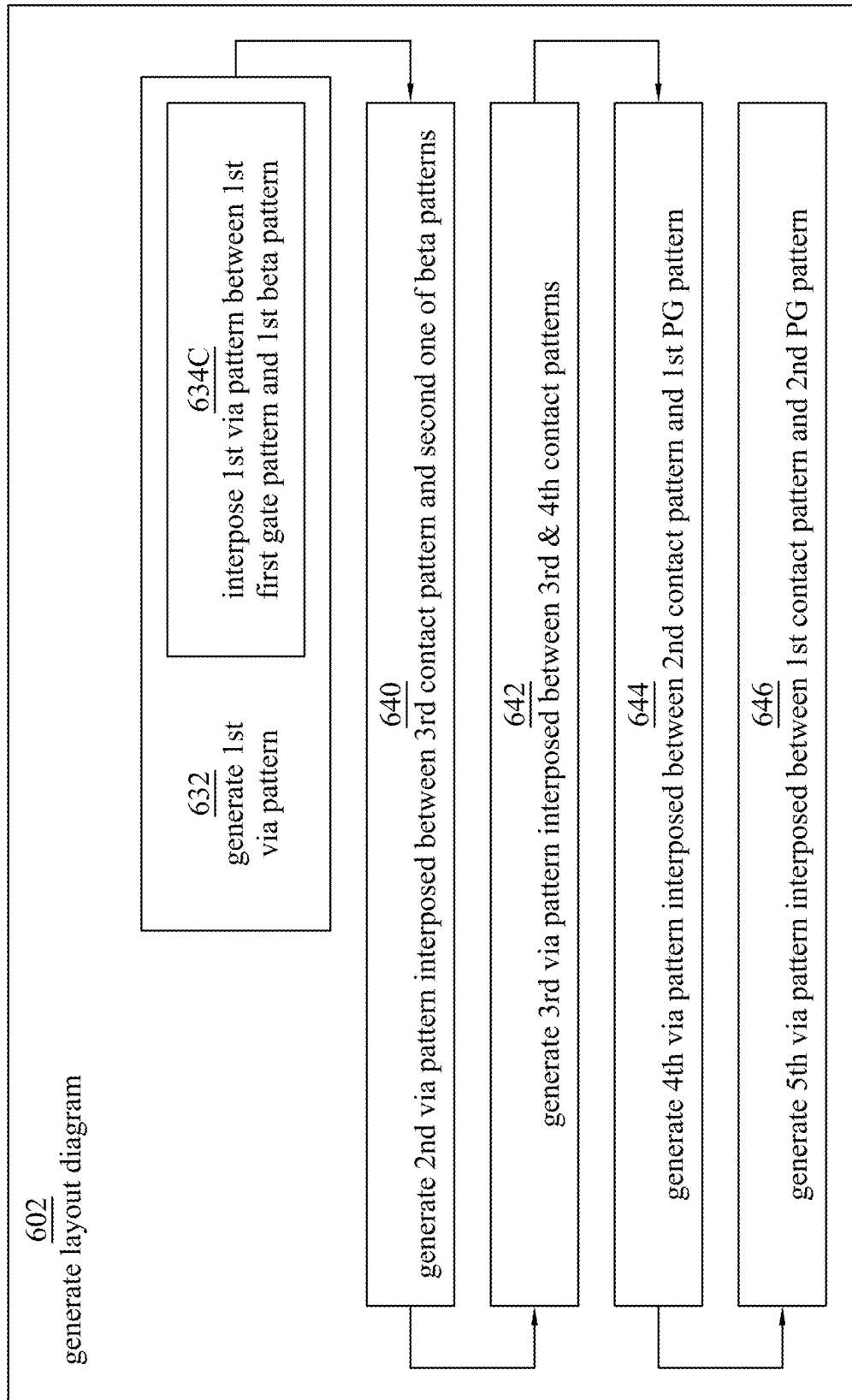

FIG. 6C is a flowchart of a method of generating a layout diagram, in accordance with some embodiments.

More particularly, the flowchart of FIG. 6C shows additional blocks included in block 602 of FIG. 6A, in accordance with one or more embodiments.

In FIG. 6C, block 602 includes blocks 632 and 640-646. Block 632 was discussed above, but is shown in FIG. 6C as including a block 634(C). At block 634(C), the first via pattern is interposed between the first gate pattern and the first one of the beta patterns. An example of the first via pattern is VGB 228(1) of FIG. 2C, and correspondingly an example of the first one of the beta patterns is LC pattern 226(6) of FIG. 2C. From block 634(C), flow exits block 632. From block 632, flow proceeds to block 640.

At block 640, a second via pattern is generated and interposed between the third contact pattern and a second one of the beta patterns. An example of the second via pattern is VMDNB 230(1) of FIG. 2C, and correspondingly an example of the second one of the beta patterns is LC pattern 226(5) of FIG. 2C. From block 640, flow proceeds to block 642.

At block 642, a third via pattern is generated and interposed between the third and fourth contact patterns. An example of the third via pattern is VMDC pattern 218(2) of FIG. 2C, and correspondingly examples of the first and fourth contact patterns are corresponding MDN pattern 214(4)(1) of FIG. 2D and MDP pattern 216(4)(1) of FIG. 2D. From block 642, flow proceeds to block 644.

At block 644, a fourth via pattern is generated and is interposed between the second contact pattern and a first one of the PG patterns. An example of the fourth via pattern is VMDPT pattern 238(3) of FIG. 2D, and correspondingly examples of the second contact pattern and the first one of the PG patterns are corresponding MDP pattern 216(3)(1) and 222(6) of FIG. 2D. From block 644, flow proceeds to block 646.

At block 646, a fifth via pattern is generated and interposed between the first contact pattern and a second one of the PG patterns. An example of the fifth via pattern is VMDNT pattern 236(2), and correspondingly examples of the first contact pattern and the second one of the PG patterns are corresponding MDN pattern 214(3)(1) and PG pattern 222(9) of FIG. 2D.

Figure 6D:
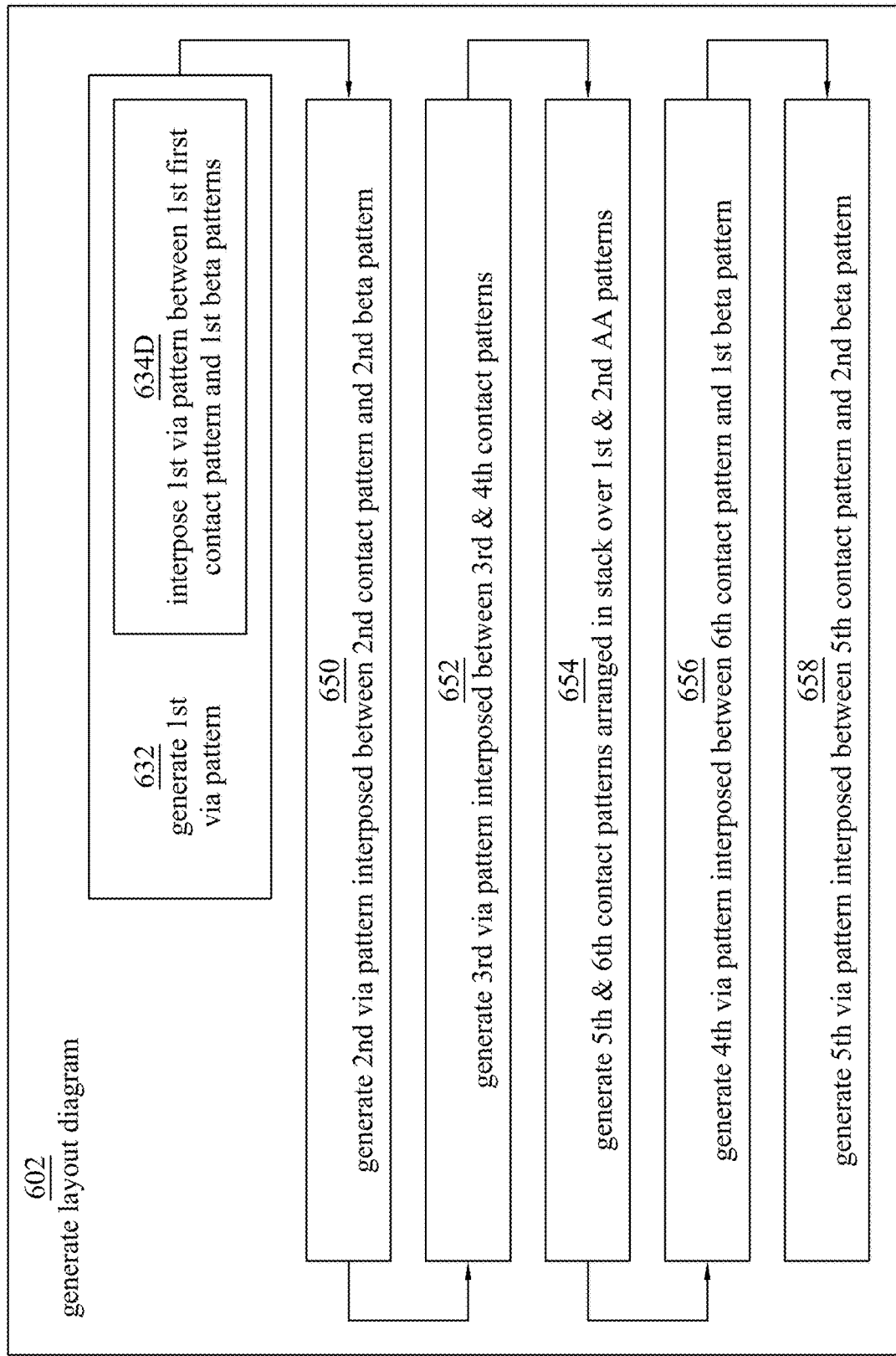

FIG. 6D is a flowchart of a method of generating a layout diagram, in accordance with some embodiments.

More particularly, the flowchart of FIG. 6D shows additional blocks included in block 602 of FIG. 6A, in accordance with one or more embodiments.

In FIG. 6D, block 602 includes blocks 632 and 650-658. Block 632 was discussed above, but is shown in FIG. 6D as including a block 634(D). At block 634(D), the first via pattern is interposed between the first contact pattern and the first one of the beta patterns. An example of the first via pattern is VMDNB pattern 330(2) of FIG. 3B(a), and correspondingly another example of the first one of the beta patterns is LC pattern 326(7) of FIG. 3B(a). From block 634(D), flow exits block 632. From block 632, flow proceeds to block 650.

At block 650, a second via pattern is generated and interposed between the second contact pattern and a second one of the beta patterns. An example of the second contact pattern is VMDPB pattern 332(1) of FIG. 3B(a), and correspondingly examples of the second contact pattern and the second one of the beta patterns are corresponding MDP pattern 316(5)(1) of FIG. 3B(a) and a second one of the beta patterns is LC pattern 326(8) FIG. 3B(a), which represents logic conductors 326(8)' in MB layer 324(3) of FIGS. 3D-3H. From block 658, flow proceeds to block 652.

At block 652, a third via pattern is generated and interposed between the third contact pattern and the fourth contact pattern. An example of the third via pattern is VMDC 318(3) of FIG. 3B(a). From block 652, flow proceeds to block 654.

At block 654, fifth and sixth contact patterns are generated and arranged in a fifth stack with the sixth contact pattern over the fifth contact pattern. Examples of the fifth and sixth contact patterns are corresponding MDN pattern 314(7)(1) in FIG. 3B(a) and MDP pattern 316(7)(1) in FIG. 3C(a). From block 654, flow proceeds to block 656.

At block 656, a fourth via pattern is generated and interposed between the sixth contact pattern and the first one of the beta patterns. An example of the fourth via pattern is VMDPB 332(2) in FIG. 3B(a), and correspondingly an example of the first one of the beta patterns is LC 326(7) in FIG. 3B(a), which represents logic conductor 326(7)' in MB layer 324(3) of FIGS. 3D-3H. From block 656, flow proceeds to block 658.

At block 658, a fifth via pattern is generated and interposed between the fifth contact pattern and the second one of the beta patterns. An example of the fifth contact pattern is VMDNB 330(3) of FIG. 3B(a)), and correspondingly an example of the second one of the beta patterns is LC pattern 326(8) FIG. 3B(a)), which represents logic conductor 326(8)' in MB layer 324(3) of FIGS. 3D-3H.

Figure 6E:
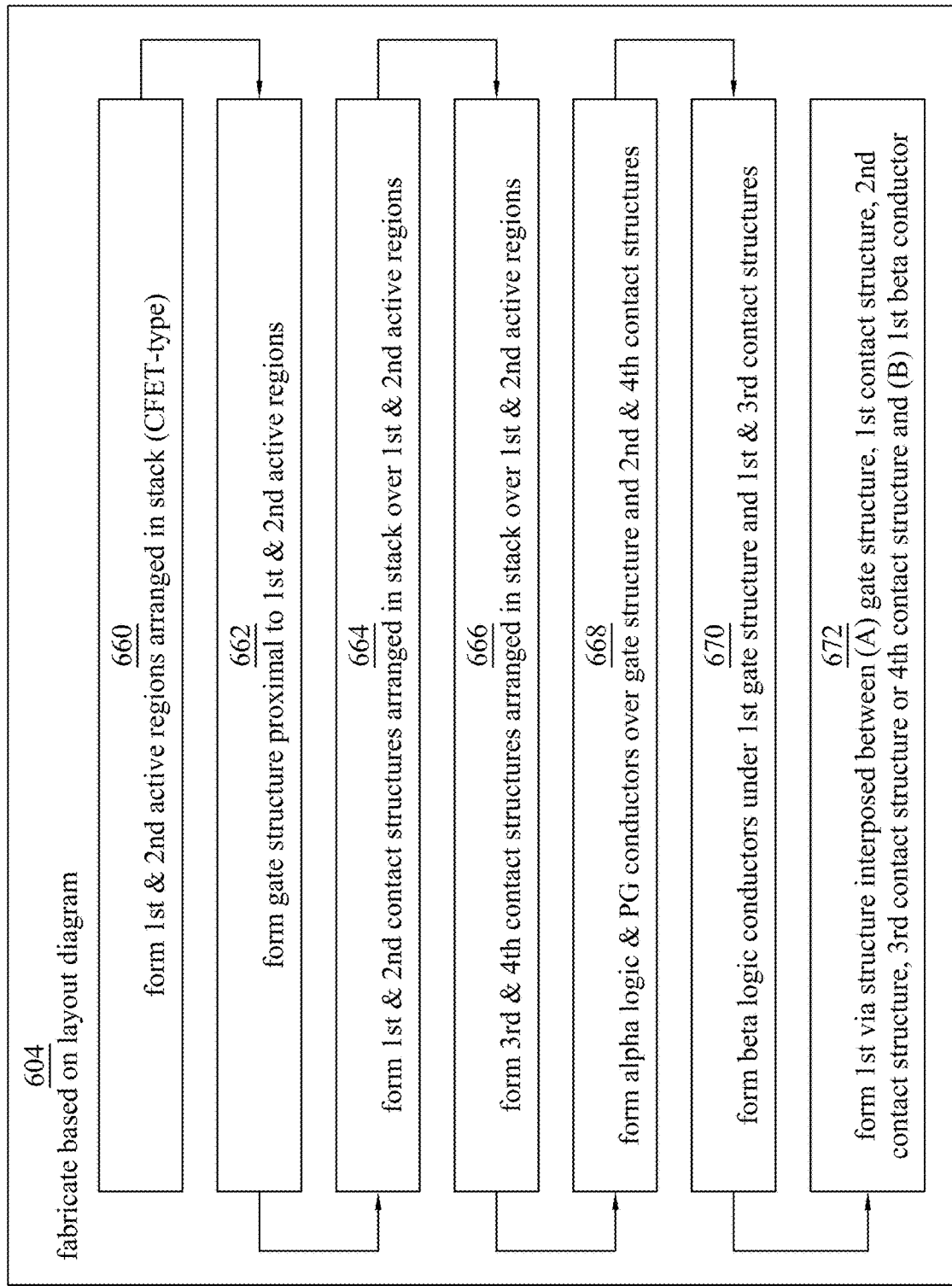
FIG. 6E is a flowchart of a method of manufacturing a semiconductor device, in accordance with some embodiments.

FIG. 6E is a flowchart of a method of manufacturing a semiconductor device, in accordance with some embodiments.

More particularly, the flowchart of FIG. 6E shows additional blocks included in block 604 of FIG. 6A, in accordance with one or more embodiments.

In FIG. 6E, block 604 includes blocks 660-662. At block 660, relative to a first direction, first and second active regions are formed and arranged in a first stack with the second active region over the first active region according to CFET-type configuration. An example of the first direction is the Z-axis. Examples of the first and second active regions include corresponding ARN region 208(1) and ARP region 210(1) of FIG. 2B. From block 660, flow proceeds to block 662.

At block 662, a gate structure is formed which is proximal to the first active region and the second active region. An example of the gate structure is gate structure 212(1) of corresponding FIG. 2B. From block 662, flow proceeds to block 664.

At block 664, first and second contact structures are formed and arranged in a second stack with the second contact structure over the first contact structure. Examples of the first and second contact structures are corresponding MDN contact structure 214(1) and MDP contact structure 216(1) of FIG. 2B. From block 664, flow proceeds to block 666.

At block 666, third and fourth contact structures are formed and arranged in a third stack with the fourth contact structure over the third contact structure. Examples of the third and fourth contact structures are corresponding MDN contact structure 214(2) and MDP contact structure 216(2) of FIG. 2B. From block 666, flow proceeds to block 668.

At block 668, alpha logic conductors and power grid (PG) conductors are formed which are in a first layer of metallization, which are correspondingly over the gate structure and the second and the fourth contact structures, and which are non-overlapping of each other. Examples of the alpha logic conductors are logic conductors 222(2) and 222(3) in M0 layer 220(1) of FIG. 2B. Examples of the PG conductors are PG conductors 222(1) and 222(4) in M0 layer 220(1) of FIG. 2B. From block 668, flow proceeds to block 670.

At block 670, beta logic conductors are formed which are correspondingly under the gate structure and the first and the third contact structures, and which are non-overlapping of each other. Examples of the beta logic conductors are logic conductors 226(1)-226(4) in MB layer 224(1) of FIG. 2B. From block 670, flow proceeds to block 672.

At block 672, a first via structure is formed which is interposed between and electrically couples (A) the first gate structure, the first contact structure, the second contact structure, the third contact structure or the fourth contact structure and (B) a first one of the beta logic conductors. An example of the first via structure is VGB 228(1)' of FIG. 2F, and correspondingly an example of the first one of the beta logic conductors is logic conductor 226(6)' of FIG. 2F. Another example of the first via structure is VMDNB 330(2)' of FIG. 3D, and correspondingly another example of the first one of the beta logic conductors is logic conductor 326(7)' of FIG. 3D.

In some embodiments, the first via structure is interposed between, and electrically couples, the gate structure and the first one of the beta logic conductors. An example of the first via structure is VGB 228(1)' of FIG. 2F, and correspondingly an example of the first one of the beta logic conductors is logic conductor 226(6)' of FIG. 2F.

In some embodiments, a second via structure is formed and interposed between, and electrically couples, the third contact structure and a second one of the beta logic conductors. An example of the second via structure is VMDNB 230(1)' of FIG. 2G, and correspondingly an example of the second one of the beta logic conductors is logic conductor 226(5)' of FIG. 2G.

In some embodiments, a third via structure is formed and interposed between, and electrically couples, the third and fourth contact structure. An example of the third via structure is VMDC 218(1) of FIG. 2B, and correspondingly examples of the first and fourth contact structures are corresponding MDN contact structure 214(2) of FIG. 2B and MDP contact structure 216(2) of FIG. 2B.

In some embodiments, a fourth via structure is generated and interposed between, and electrically couples, the second contact structure and a first one of the PG conductors. An example of the fourth via pattern is VMDPT structure 238(1) of FIG. 2B, and correspondingly examples of the second contact structure and the first one of the PG conductors are corresponding MDP pattern 216(1) and 222(1) of FIG. 2B.

In some embodiments, a fifth via structure is formed and interposed between, and electrically couples, the first contact structure and a second one of the PG conductors. An example of the fifth via structure is VMDNT structure 236(1) of FIG. 2B, and correspondingly examples of the first contact structure and the second one of the PG conductors are corresponding MDN pattern 214(1) and PG conductor 222(4) of FIG. 2B.

In some embodiments, the first via structure is interposed between the first contact structure and the first one of the beta logic conductor. An example of the first via structure is VMDNB structure 330(2)' of FIG. 3D, and correspondingly another example of the first one of the beta logic conductors is logic conductor 326(7)' of FIG. 3D.

In some embodiments, a second via structure is formed and interposed between, and electrically couples, the second contact structure and a second one of the beta logic conductors. An example of the second contact structure is VMDPB structure 332(1)' of FIG. 3D, and correspondingly examples of the second contact structure and the second one of the beta conductors are corresponding MDP structure 316(5)(1)'-(4)' of FIG. 3D and a second one of the beta logic conductors is logic conductors 326(8)' in MB layer 324(3) of FIGS. 3D-3H.

In some embodiments, a third via structure is formed and interposed between, and electrically couples, the third contact structure and the fourth contact structure. An example of the third via structure is VMDC 318(3)' of FIG. 3D.

In some embodiments, fifth and sixth contact structures are formed and arranged in a fourth stack with the sixth contact structure over the fifth contact structure. Examples of the fifth and sixth contact structures are corresponding MDN structure 314(7)(1)'-(4)' in FIG. 3H and MDP structure 316(7)(1)'-(4)' in FIG. 3H.

In some embodiments, a fourth via structure is generated and interposed between, and electrically couples, the sixth contact pattern and the first one of the beta logic conductors. An example of the fourth via structure is VMDPB 332(2)' in FIG. 3H, and correspondingly an example of the first one of the beta logic conductors is logic conductor 326(7)' in MB layer 324(3) of FIGS. 3D-3H.

In some embodiments, a fifth via structure is generated and interposed between, and electrically couples, the fifth contact structure and the second one of the beta logic conductors. An example of the fifth contact structure is VMDNB structure 330(3)' of FIG. 3Ha)), and correspondingly an example of the second one of the beta conductors is logic conductor 326(8)' in MB layer 324(3) of FIGS. 3D-3H.

Figure 7:
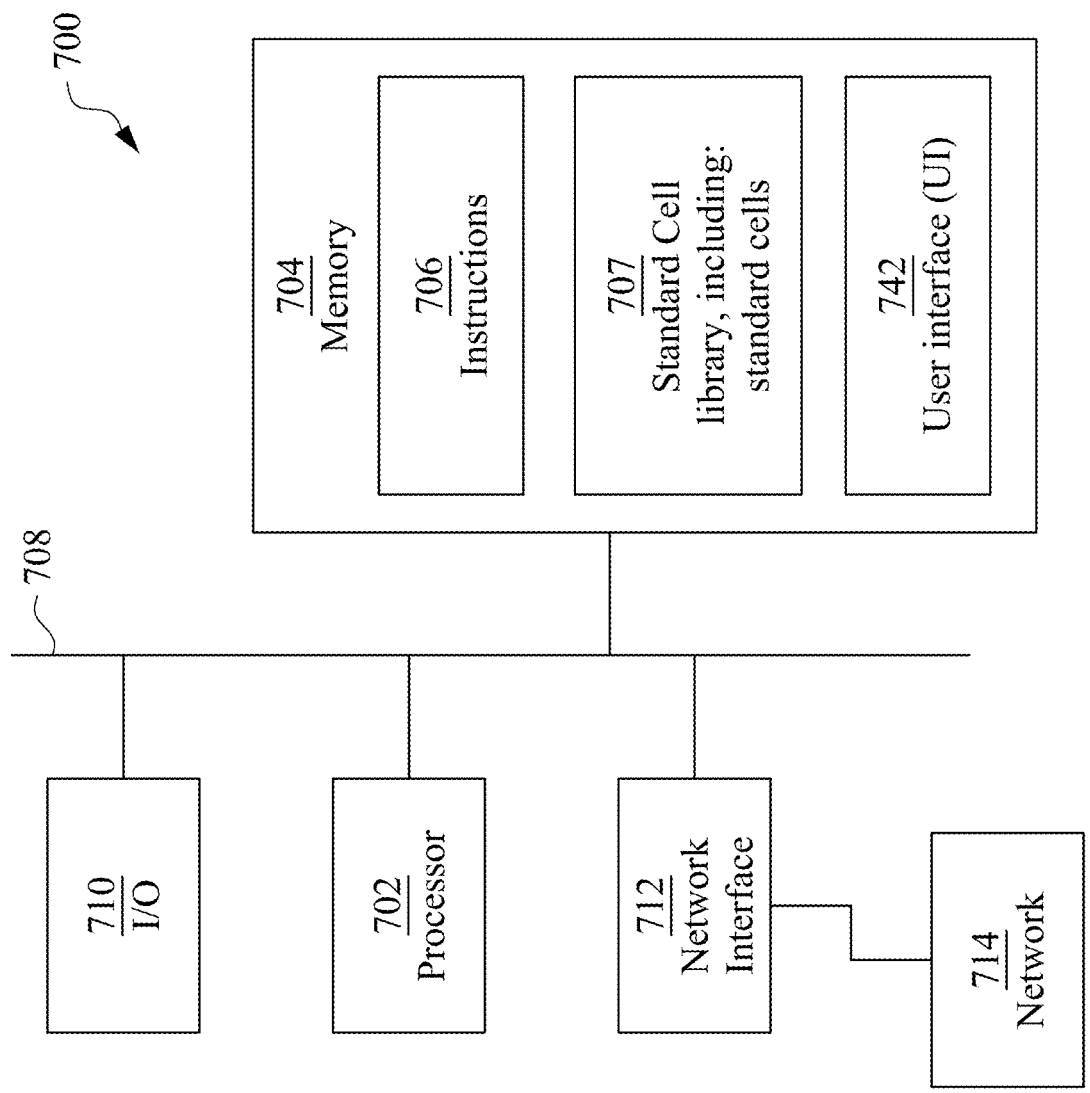
FIG. 7 is a block diagram of an electronic design automation (EDA) system in accordance with some embodiments.

FIG. 7 is a block diagram of an electronic design automation (EDA) EDA system 700 in accordance with some embodiments.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of computer-executable instructions. Execution of instructions 706 by hardware processor 702 represents (at least in part) an EDA tool which implements a portion or all of the methods described herein in accordance with one or more embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause EDA system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows EDA system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

EDA system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
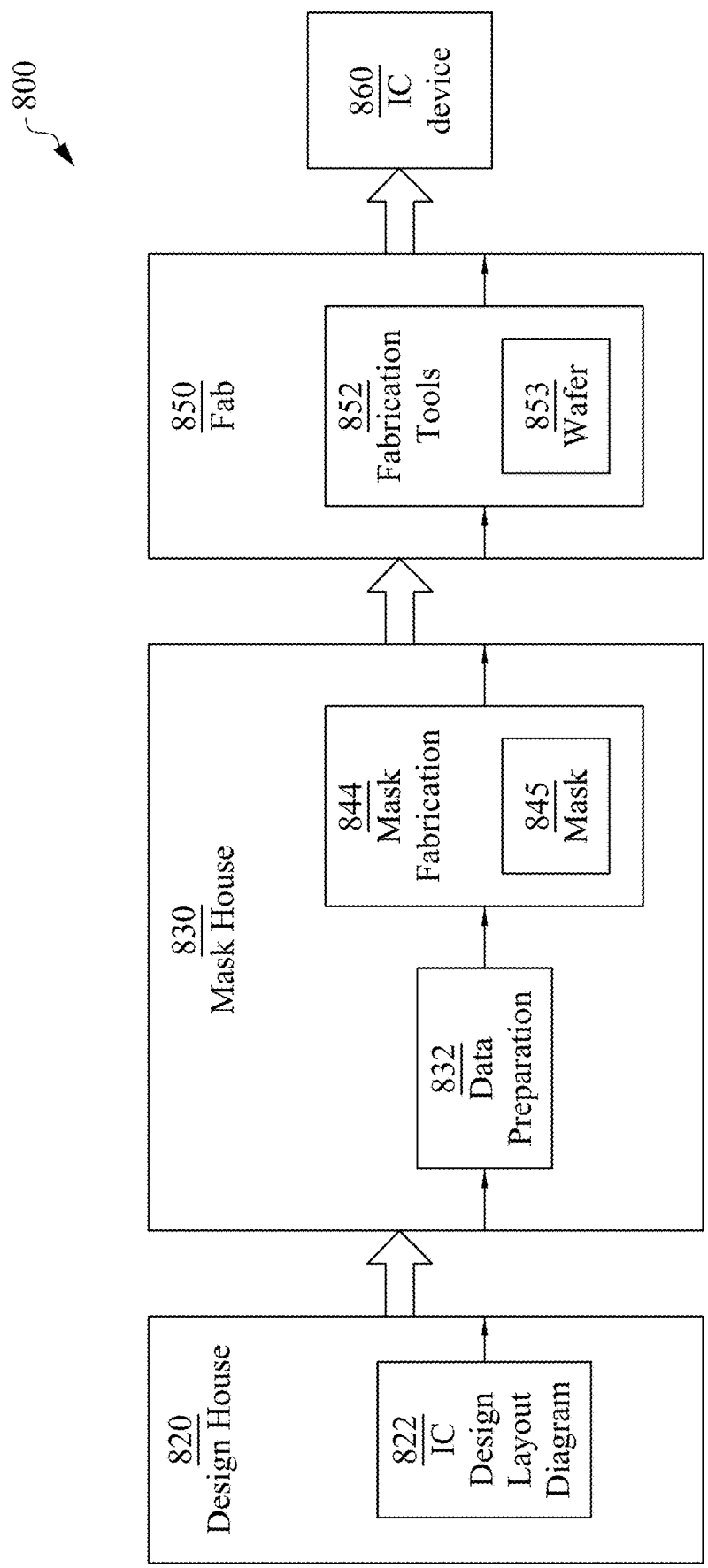
FIG. 8 is a block diagram of a semiconductor device manufacturing system, and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments.

In some embodiments, based on a layout diagram, e.g., at least one of (A) one or more semiconductor masks or (b) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 includes fabrication tools 852 configured to execute various manufacturing operations on semiconductor wafer 853 such that IC device 860 is fabricated in accordance with the mask(s), e.g., mask 845. In various embodiments, fabrication tools 852 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method (of manufacturing a semiconductor device which includes a buried logic conductor (BLC) CFET region) includes; forming first and second active regions arranged in a first stack with the second active region over the first active region; forming a gate structure proximal to the first and second active regions; forming first and second contact structures which are arranged in a second stack with the second contact structure over the first contact structure, and which are electrically coupled to the corresponding first and second active regions; forming third and fourth contact structures which are arranged in a third stack with the fourth contact structure over the third contact structure, and which are electrically coupled to the corresponding first and second active regions; forming alpha logic conductors and power grid (PG) conductors which are in a first layer of metallization, which are correspondingly over the gate structure and the second and fourth contact structures, and which are non-overlapping of each other; forming beta logic conductors which are in a buried layer of metallization, which are correspondingly under the gate structure and the first and the third contact structures, and which are non-overlapping of each other, and represent corresponding beta logic conductors in a buried layer of metallization; and forming a first via structure which is interposed between and electrically couples (A) the gate structure, the first contact structure, the second contact structure, the third contact structure or the fourth contact structure and (B) a first one of the beta logic conductors. In some embodiments, the first via structure is interposed between the gate structure and the first one of the beta logic conductors; and the method further includes: forming a second via structure which is interposed between, and electrically couples, the third contact structure and a second one of the beta logic conductors. In some embodiments, the method further includes: forming a third via structure which is interposed between, and electrically couples, the third and fourth contact structures; forming a fourth via structure which is interposed between, and electrically couples, the second contact structure and a first one of the PG conductors; and forming a fifth via structure which is interposed between, and electrically couples, the first contact structure and a second one of the PG conductors. In some embodiments, the first via structure is interposed between the first contact structure and the first one of the beta logic conductors, and the method further includes: forming a second via structure which is interposed between, and electrically couples, the second contact structure and a second one of the beta logic conductors; forming a third via structure which is interposed between, and electrically couples, the third contact structure and the fourth contact structure; forming fifth and sixth contact structures which are arranged in a fourth stack with the sixth contact structure over the fifth contact structure, and which electrically coupled to the corresponding first and second active regions; forming a fourth via structure which is interposed between, and electrically couples, the sixth contact structure and the first one of the beta logic conductors; and represents a corresponding via structure that electrically couples abutting structures; and forming a fifth via structure which is interposed between, and electrically couples, the fifth contact structure and the second one of the beta logic conductors.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

In an embodiment, a semiconductor device includes a buried logic conductor (BLC) CFET, the BLC CFET including: relative to a first direction, first and second active regions arranged in a stack according to CFET-type configuration; first and second contact structures correspondingly electrically coupled to the first active region; third and fourth contact structures correspondingly electrically coupled to the second active region; a first layer of metallization (M_1st layer) over the stack which includes: alpha logic conductors configured for logic signals (alpha logic conductors); and power grid (PG) conductors; the alpha logic and PG conductors being non-overlapping of each other; and a layer of metallization below the stack (M_B layer) which includes beta logic conductors which are non-overlapping of each other; and wherein, relative to a second direction which is perpendicular to the first direction, each of the alpha logic, PG and beta logic conductors at least partially overlap one or more of the first, second, third and fourth contact structures. In an embodiment, the M_1st layer has multiple pitches which includes: a pitch of the alpha logic conductors (pch_M_1st_lgk); and a pitch of the PG conductors (pch_M_1st_pg); and pch_M_1st_lgk<pch_M_1st_pg. In an embodiment, the M_B layer has a sole pitch represented by a pitch of the beta logic conductors (pch_M_B_lgk). In an embodiment, pch_M_1st_lgk<pch_M_B_lgk; or pch_M_B_lgk≤pch_M_1st_pg. In an embodiment, the M_B layer has a sole pitch represented by a pitch of the beta logic conductors (pch_M_B_lgk); and a first pitch of the alpha logic conductors in the M_1st layer (pch_M_1st_lgk) is less than pch_M_B_lgk such that: pch_M_1st_lgk<pch_M_B_lgk. In an embodiment, pch_M_B_lgk is less or equal to a second pitch of the PG conductors in the M_1st layer (pch_M_1st_pg) such that: pch_M_B_lgk≤pch_M_1st_pg. In an embodiment, the semiconductor device further includes a circuit; and wherein the BPG CFET is included in the circuit. In an embodiment, the circuit is an inverter, a transmission gate or a flip-flop.

In an embodiment, a semiconductor device includes a buried logic conductor (BLC) CFET, the BLC CFET including: first and second active regions arranged in a stack according to CFET-type configuration with the second active region over the first active region; a gate structure proximal to the first and second active regions; first and second contact structures correspondingly electrically coupled to the first active region; third and fourth contact structures correspondingly electrically coupled to the second active region; a first layer of metallization (M_1st layer) over the stack which includes: alpha logic conductors configured for logic signals (alpha logic conductors); and power grid (PG) conductors; and a layer of metallization below (M_B) the stack (M_B layer) and which includes beta logic conductors; a first via structure electrically coupled between a first candidate and a first one of the beta logic conductors in the M_B layer, the first candidate being one of the gate structure or one of the first, second, third or fourth contact structures. In an embodiment, the first candidate is the second contact structure; and the semiconductor device further includes: a second via structure electrically coupled between the gate structure and a second one of the beta logic conductors in the M_B layer. In an embodiment, the semiconductor device further includes: a third via structure electrically coupled between the third contact structure and a first one of the PG conductors in the M_1st layer. In an embodiment, the first candidate is the second contact structure; and the semiconductor device further includes: a fourth via structure electrically coupled between the first contact structure and a second one of the conductors in the M_1st layer. In an embodiment, the first candidate is the first contact structure; and the semiconductor device further includes: a fifth contact structure electrically coupled to the first active region; a sixth contact structure electrically coupled to the second active region; and a second via structure electrically coupled between the second contact structure and a second one of the beta conductors in the M_B layer. In an embodiment, the semiconductor device further includes: a third via structure electrically coupled between the third contact structure and the first one of the beta conductors in the M_B layer; or a fourth via structure electrically coupled between the fourth contact structure and the second one of the beta conductors in the M_B layer. In an embodiment, the semiconductor device further includes: a third via structure electrically coupled between the gate structure and a first one of the alpha conductors in the M_1st layer; or a fourth via structure electrically coupled between the gate structure and a second one of the alpha conductors in the M_1st layer. In an embodiment, the semiconductor device further includes: a third via structure electrically coupled between the fifth contact structure and the sixth contact structure.

In an embodiment, a method (of manufacturing a semiconductor device which includes a buried logic conductor (BLC) CFET region, for a layout diagram stored on a non-transitory computer-readable medium) includes generating the layout diagram including: generating first and second active area (AA) patterns arranged in a first stack with the second AA pattern over the first AA pattern, and represent a CFET-type configuration of corresponding first and second active regions in the semiconductor device; generating a first and second gate patterns arranged in second stack with the first gate pattern over the first AA pattern, and with the second gate pattern over the second AA pattern, and which represent corresponding first and parts of a first gate structure; generating first and second contact patterns are arranged in a third stack with the second contact pattern over the first contact pattern, and which represent first parts of corresponding first and second contact structures electrically coupled to the corresponding first and second active regions; generating third and fourth contact patterns are arranged in a fourth stack with the fourth contact pattern over the third contact pattern, and which represent first parts of corresponding third and fourth contact structures electrically coupled to the corresponding first and second active regions; generating alpha patterns and power grid (PG) patterns which are correspondingly over the second gate pattern and the second and the fourth contact patterns, are non-overlapping of each other, and represent corresponding alpha logic and PG conductors in a first layer of metallization; generating beta patterns which are correspondingly under the first gate pattern and the first and the third contact patterns, are non-overlapping of each other, and represent corresponding beta logic conductors in a buried layer of metallization; and generating a first via pattern which is interposed between (A) the first gate pattern, the second contact pattern or the fourth contact pattern and (B) a first one of the beta patterns, and which represents a corresponding via structure that electrically couples abutting structures. In an embodiment, the method further includes, based on the layout diagram, at least one of: (A) making one or more photolithographic exposure; (B) fabricating one or more semiconductor masks; or (C) fabricating at least one component in a layer of a semiconductor integrated circuit. In an embodiment, the first via pattern is interposed between the first gate pattern and the first one of the beta patterns; and the generating the layout diagram further includes: generating a second via pattern which is interposed between the third contact pattern and a second one of the beta patterns, and represents a corresponding via structure that electrically couples abutting structures; generating a third via pattern which is interposed between the third and fourth contact patterns, and represents a corresponding via structure that electrically couples abutting structures; generating a fourth via pattern which is interposed between the second contact pattern and a first one of the PG patterns, and represents a corresponding via structure that electrically couples abutting structures; and generating a fifth via pattern which is interposed between the first contact pattern and a second one of the PG patterns, and represents a corresponding via structure that electrically couples abutting structures. In an embodiment, the first via pattern is interposed between the first contact pattern and the first one of the beta patterns; and the generating the layout diagram further includes: generating a second via pattern which is interposed between the second contact pattern and a second one of the beta patterns, and represents a corresponding via structure that electrically couples abutting structures; generating a third via pattern which is interposed between the third contact pattern and the fourth contact pattern, and represents a corresponding via structure that electrically couples abutting structures; generating fifth and sixth contact patterns are arranged in a fifth stack with the sixth contact pattern over the fifth contact pattern, and which represent first parts of corresponding fifth and sixth structures electrically coupled to the corresponding first and second active regions; generating a fourth via pattern which is interposed between the sixth contact pattern and the first one of the beta patterns; and represents a corresponding via structure that electrically couples abutting structures; and generating a fifth via pattern which is interposed between the fifth contact pattern and the second one of the beta patterns, and represents a corresponding via structure that electrically couples abutting structures.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device comprising a buried logic conductor (BLC) CFET, the BLC CFET including:
    relative to a first direction, first and second active regions arranged in a stack according to CFET-type configuration;
    first and second contact structures correspondingly electrically coupled to the first active region;
    third and fourth contact structures correspondingly electrically coupled to the second active region;
    a first layer of metallization (M_1st layer) over the stack which includes:
        alpha logic conductors configured for logic signals (alpha logic conductors); and
        power grid (PG) conductors;
        the alpha logic and PG conductors being non-overlapping of each other; and
    a layer of metallization below the stack (M_B layer) which includes beta logic conductors which are non-overlapping of each other; and
    wherein, relative to a second direction perpendicular to the first direction, each of the alpha logic, PG and beta logic conductors at least partially overlap one or more of the first, second, third and fourth contact structures.

2. The semiconductor device of claim 1, wherein:
the M_1st layer has multiple pitches which includes:
    a pitch of the alpha logic conductors (pch_M_1st_lgk); and
    a pitch of the PG conductors (pch_M_1st_pg); and pch_M_1st_lgk<pch_M_1st_pg.

3. The semiconductor device of claim 2, wherein:
the M_B layer has a sole pitch represented by a pitch of the beta logic conductors (pch_M_B_lgk).

4. The semiconductor device of claim 3, wherein:

pch_M_1st_lgk<pch_M_B_lgk; or pch_M_B_lgk≤pch_M_1st_pg.

5. The semiconductor device of claim 1, wherein:
the M_B layer has a sole pitch represented by a pitch of the beta logic conductors (pch_M_B_lgk); and
    a first pitch of the alpha logic conductors in the M_1st layer (pch_M_1st_lgk) is less than pch_M_B_lgk such that:

pch_M_1st_lgk<pch_M_B_lgk.

6. The semiconductor device of claim 5, wherein:
pch_M_B_lgk is less or equal to a second pitch of the PG conductors in the M_1st layer (pch_M_1st_pg) such that:

pch_M_B_lgk≤pch_M_1st_pg.

7. The semiconductor device of claim 1, further comprising:
    a circuit; and
    wherein the BLC CFET is included in the circuit.

8. The semiconductor device of claim 7, wherein:
the circuit is an inverter, a transmission gate or a flip-flop.

9. A semiconductor device comprising a buried logic conductor (BLC) CFET, the BLC CFET including:
    first and second active regions arranged in a stack according to CFET-type configuration with the second active region over the first active region;
    a gate structure proximal to the first and second active regions;
    first and second contact structures correspondingly electrically coupled to the first active region;
    third and fourth contact structures correspondingly electrically coupled to the second active region;
    a first layer of metallization (M_1st layer) over the stack which includes:
        alpha logic conductors configured for logic signals (alpha logic conductors); and
        power grid (PG) conductors; and
    a layer of metallization below (M_B) the stack (M_B layer) and which includes beta logic conductors;
    a first via structure electrically coupled between a first candidate and a first one of the beta logic conductors in the M_B layer, the first candidate being one of the gate structure or one of the first, second, third or fourth contact structures.

10. The semiconductor device of claim 9, wherein:
the first candidate is the second contact structure; and
the semiconductor device further comprises:
    a second via structure electrically coupled between the gate structure and a second one of the beta logic conductors in the M_B layer.

11. The semiconductor device of claim 10, further comprising:
a third via structure electrically coupled between the third contact structure and a first one of the PG conductors in the M_1st layer.

12. The semiconductor device of claim 11, wherein:
the first candidate is the second contact structure; and
the semiconductor device further comprises:
a fourth via structure electrically coupled between the first contact structure and a second one of the conductors in the M_1st layer.

13. The semiconductor device of claim 9, wherein:
the first candidate is the first contact structure; and
the semiconductor device further comprises:
a fifth contact structure electrically coupled to the first active region;
a sixth contact structure electrically coupled to the second active region; and
a second via structure electrically coupled between the second contact structure and a second one of the beta conductors in the M_B layer.

14. The semiconductor device of claim 13, further comprising:
a third via structure electrically coupled between the third contact structure and the first one of the beta conductors in the M_B layer; or
a fourth via structure electrically coupled between the fourth contact structure and the second one of the beta conductors in the M_B layer.

15. The semiconductor device of claim 13, further comprising:
a third via structure electrically coupled between the gate structure and a first one of the alpha conductors in the M_1st layer; or
a fourth via structure electrically coupled between the gate structure and a second one of the alpha conductors in the M_1st layer.

16. The semiconductor device of claim 13, further comprising:
a third via structure electrically coupled between the fifth contact structure and the sixth contact structure.

17. A method of manufacturing a semiconductor device which includes a buried logic conductor (BLC) CFET region, the method comprising forming:
forming first and second active regions arranged in a first stack with the second active region over the first active region;
forming a gate structure proximal to the first and second active regions;
forming first and second contact structures which are arranged in a second stack with the second contact structure over the first contact structure, and which are electrically coupled to the corresponding first and second active regions;
forming third and fourth contact structures which are arranged in a third stack with the fourth contact structure over the third contact structure, and which are electrically coupled to the corresponding first and second active regions;
forming alpha logic conductors and power grid (PG) conductors which are in a first layer of metallization, which are correspondingly over the gate structure and the second and fourth contact structures, and which are non-overlapping of each other;
forming beta logic conductors which are in a buried layer of metallization, which are correspondingly under the gate structure and the first and the third contact structures, and which are non-overlapping of each other, and represent corresponding beta logic conductors in a buried layer of metallization; and
forming a first via structure which is interposed between and electrically couples (A) the gate structure, the first contact structure, the second contact structure, the third contact structure or the fourth contact structure and (B) a first one of the beta logic conductors.

18. The method of claim 17, wherein:
the first via structure is interposed between the gate structure and the first one of the beta logic conductors; and
the method further comprises:
forming a second via structure which is interposed between, and electrically couples, the third contact structure and a second one of the beta logic conductors.

19. The method of claim 18, further comprising:
forming a third via structure which is interposed between, and electrically couples, the third and fourth contact structures;
forming a fourth via structure which is interposed between, and electrically couples, the second contact structure and a first one of the PG conductors; and
forming a fifth via structure which is interposed between, and electrically couples, the first contact structure and a second one of the PG conductors.

20. The method of claim 17, wherein:
the first via structure is interposed between the first contact structure and the first one of the beta logic conductors; and
the method further comprises:
forming a second via structure which is interposed between, and electrically couples, the second contact structure and a second one of the beta logic conductors;
forming a third via structure which is interposed between, and electrically couples, the third contact structure and the fourth contact structure;
forming fifth and sixth contact structures which are arranged in a fourth stack with the sixth contact structure over the fifth contact structure, and which electrically coupled to the corresponding first and second active regions;
forming a fourth via structure which is interposed between, and electrically couples, the sixth contact structure and the first one of the beta logic conductors; and represents a corresponding via structure that electrically couples abutting structures; and
forming a fifth via structure which is interposed between, and electrically couples, the fifth contact structure and the second one of the beta logic conductors.

* * * * *